United States Patent
Griggs et al.

(10) Patent No.: US 11,110,666 B2
(45) Date of Patent: Sep. 7, 2021

(54) SYSTEMS WITH EXTERNAL HEAT-SEAL ASSEMBLY HEIGHT ADJUSTMENT CONTROL AND RELATED SEAL ASSEMBLIES

(71) Applicant: Tipper Tie, Inc., Apex, NC (US)

(72) Inventors: Samuel D. Griggs, Apex, NC (US); Dennis J. May, Pittsboro, NC (US); Derek L. Brown, Clayton, NC (US); William M. Poteat, Fuquay Varina, NC (US)

(73) Assignee: TIPPER TIE, INC., Apex, NC (US)

( * ) Notice: Subject to any disclaimer, the term of this patent is extended or adjusted under 35 U.S.C. 154(b) by 188 days.

(21) Appl. No.: 16/272,891

(22) Filed: Feb. 11, 2019

(65) Prior Publication Data

US 2019/0248080 A1     Aug. 15, 2019

Related U.S. Application Data

(60) Provisional application No. 62/629,480, filed on Feb. 12, 2018.

(51) Int. Cl.
*B29C 65/00* (2006.01)
*B29C 65/18* (2006.01)
(Continued)

(52) U.S. Cl.
CPC ............ *B29C 66/849* (2013.01); *A22C 11/00* (2013.01); *B29C 53/50* (2013.01); *B29C 65/18* (2013.01);
(Continued)

(58) Field of Classification Search
CPC ....... B29C 66/849; B29C 53/50; B29C 65/18; A22C 11/00; B65B 1/10; B65B 57/18; B65B 9/10; B65B 2051/105
(Continued)

(56) References Cited

U.S. PATENT DOCUMENTS 2,494,905 A    1/1950  Shumann
2,741,296 A    4/1956  Collins
(Continued)

FOREIGN PATENT DOCUMENTS

DE    195 01 982 A1    7/1996
DE    195 17 127 A1    11/1996
(Continued)

OTHER PUBLICATIONS

Extended European Search Report dated Jun. 30, 2017, issued in corresponding EP Application No. 14 85 9217, filed Oct. 29, 2014, 12 pages.
(Continued)

*Primary Examiner* — Dariush Seif
(74) *Attorney, Agent, or Firm* — Christensen O'Connor Johnson Kindness PLLC

(57) ABSTRACT

Packaging apparatus for producing encased products from flat-roll stock using an external user interface (i.e., a handle that is external to a housing holding the heat seal assembly that is attached to a horizontally oriented shaft that rotates a first gear in the housing to rotate an aligned second gear in the housing or an electronic control) that is attached to and/or in communication with (directly or indirectly) a heat-seal assembly with a heat-seal contact member, such as a heat-seal band, in the housing to allow a user to adjust a vertical height of the heat-seal assembly while the apparatus is operational and/or without requiring physical access to the interior of the housing.

18 Claims, 23 Drawing Sheets

(51) Int. Cl.
*B29C 53/50* (2006.01)
*B65B 51/10* (2006.01)
*B65B 57/18* (2006.01)
*A22C 11/00* (2006.01)
*B65B 9/10* (2006.01)

(52) U.S. Cl.
CPC .............. *B65B 51/10* (2013.01); *B65B 57/18* (2013.01); *B65B 9/10* (2013.01); *B65B 2051/105* (2013.01)

(58) Field of Classification Search
USPC ........................................................ 53/548
See application file for complete search history.

(56) References Cited

U.S. PATENT DOCUMENTS

| | | |
|---|---|---|
| 2,800,162 A | 7/1957 | Rohdin |
| 2,831,302 A | 4/1958 | Jensen et al. |
| 3,218,961 A | 11/1965 | Kraft et al. |
| 3,543,378 A | 12/1970 | Klenz |
| 3,665,673 A * | 5/1972 | Billett .................... B65B 51/306 53/441 |
| 3,833,440 A | 9/1974 | Kashiwa et al. |
| 3,925,139 A | 12/1975 | Simmons |
| 3,950,213 A | 4/1976 | Rejeski et al. |
| 4,075,815 A | 2/1978 | Carver, Jr. et al. |
| 4,218,863 A * | 8/1980 | Howard .................... B29C 65/10 53/547 |
| 4,288,965 A | 9/1981 | James |
| 4,525,977 A | 7/1985 | Matt |
| 4,546,596 A | 10/1985 | Cherney |
| 4,563,792 A * | 1/1986 | Niedecker .............. A22C 11/02 452/31 |
| 4,574,566 A | 3/1986 | Eaves et al. |
| 4,675,945 A | 6/1987 | Evans |
| 4,722,168 A | 2/1988 | Heaney |
| 4,773,128 A * | 9/1988 | Stanley .............. A22C 11/0245 452/31 |
| 4,847,953 A * | 7/1989 | Evans ................ A22C 11/0218 452/36 |
| 4,858,416 A | 8/1989 | Monaghan |
| 4,860,522 A | 8/1989 | Cherney |
| 4,884,387 A | 12/1989 | James |
| 4,924,659 A * | 5/1990 | Watanabe .............. B65B 51/303 53/550 |
| 4,965,986 A | 10/1990 | Klinkel |
| 5,026,266 A * | 6/1991 | Takasaki .............. B29C 49/2408 264/509 |
| 5,067,307 A | 11/1991 | Francioni et al. |
| 5,067,313 A | 11/1991 | Evans |
| 5,074,386 A | 12/1991 | Evans |
| 5,085,036 A * | 2/1992 | Evans ..................... B29C 53/50 493/302 |
| 5,092,102 A | 3/1992 | James et al. |
| 5,125,217 A | 6/1992 | Fukuda |
| 5,154,037 A | 10/1992 | Focke |
| 5,167,567 A | 12/1992 | Evans |
| 5,181,302 A | 1/1993 | Evans |
| 5,203,760 A * | 4/1993 | Chen ....................... B29C 53/50 493/302 |
| 5,241,800 A | 9/1993 | Steinke et al. |
| 5,341,623 A * | 8/1994 | Siegel .............. B29C 66/81435 53/433 |
| 5,357,731 A | 10/1994 | Conway et al. |
| 5,357,733 A | 10/1994 | Weikert |
| 5,377,474 A | 1/1995 | Kovacs et al. |
| 5,400,565 A | 3/1995 | Terminella et al. |
| 5,485,712 A | 1/1996 | Cherney et al. |
| 5,514,029 A | 5/1996 | Schutz |
| 5,566,526 A | 10/1996 | Suga |
| 5,603,801 A * | 2/1997 | DeFriese .............. B29C 65/7439 156/251 |
| 5,715,647 A * | 2/1998 | Keim .................. B29C 66/8161 53/374.5 |
| 5,717,647 A | 2/1998 | Hush et al. |
| 5,727,366 A | 3/1998 | Manly, Jr. |
| 5,743,792 A | 4/1998 | Hanten et al. |
| 5,822,949 A | 10/1998 | Naoi |
| 5,996,319 A * | 12/1999 | Lerner .................. B65B 43/123 53/373.6 |
| 6,027,596 A * | 2/2000 | DeFriese .............. B29C 65/7439 156/213 |
| 6,047,521 A | 4/2000 | Terminella et al. |
| 6,058,681 A * | 5/2000 | Recchia, Jr. ............ B65B 9/093 53/373.5 |
| 6,139,416 A | 10/2000 | Topfer |
| 6,146,261 A | 11/2000 | Bienert et al. |
| 6,185,907 B1 | 2/2001 | Malin et al. |
| 6,216,425 B1 | 4/2001 | Hanten |
| 6,217,436 B1 | 4/2001 | Hanten et al. |
| 6,219,998 B1 | 4/2001 | Demming et al. |
| 6,237,308 B1 | 5/2001 | Quintin et al. |
| 6,272,815 B1 | 8/2001 | Todd et al. |
| 6,298,635 B1 | 10/2001 | Bienert et al. |
| 6,305,145 B2 | 10/2001 | Suolahti |
| 6,308,493 B1 * | 10/2001 | Mack .................. B29C 66/8224 53/75 |
| 6,381,919 B2 | 5/2002 | Todd et al. |
| 6,386,851 B1 | 5/2002 | Gustafsson |
| 6,401,885 B1 | 6/2002 | Whittlesey |
| 6,526,728 B1 * | 3/2003 | Sorenson .............. B29C 65/229 53/373.5 |
| 6,553,744 B1 | 4/2003 | Terminella et al. |
| 6,625,517 B1 | 9/2003 | Bogdanov et al. |
| 6,651,705 B1 | 11/2003 | Topfer |
| 6,666,004 B2 | 12/2003 | Hilbert, Sr. et al. |
| 6,669,545 B1 | 12/2003 | Hergott et al. |
| 6,705,063 B1 | 3/2004 | Topfer et al. |
| 6,711,875 B2 | 3/2004 | Van Rens et al. |
| 6,826,888 B2 | 12/2004 | Hendriks et al. |
| 6,875,100 B2 | 4/2005 | Topfer et al. |
| 6,962,033 B2 | 11/2005 | Guzman |
| 7,021,028 B2 | 4/2006 | Hanten |
| 7,082,737 B2 | 8/2006 | Van Rens et al. |
| 7,124,553 B2 | 10/2006 | Norton et al. |
| 7,172,545 B2 | 2/2007 | Howell et al. |
| 7,281,362 B2 * | 10/2007 | James ................ B29C 65/7433 53/373.7 |
| 7,306,511 B2 * | 12/2007 | Whittlesey .......... A22C 11/0209 452/45 |
| 7,310,926 B2 | 12/2007 | Nikoley et al. |
| 7,318,305 B2 | 1/2008 | Reiche |
| 7,325,380 B2 | 2/2008 | Ebert |
| 7,392,642 B2 | 7/2008 | Topfer |
| 7,479,057 B2 | 1/2009 | Waldstaedt et al. |
| 7,513,821 B2 | 4/2009 | Waldstadt |
| 7,549,915 B2 | 6/2009 | Duringer |
| 7,553,222 B2 | 6/2009 | Jackel |
| 7,604,531 B2 | 10/2009 | Hanten |
| 7,618,307 B2 | 11/2009 | Gladh |
| 7,637,299 B2 * | 12/2009 | King, Jr. .............. B26D 7/2628 156/515 |
| 7,650,729 B2 * | 1/2010 | Whittlesey ............. A22C 11/02 53/138.2 |
| 7,673,434 B2 | 3/2010 | Kinoshita |
| 7,685,795 B2 * | 3/2010 | King, Jr. .............. B29C 65/7873 53/459 |
| 7,704,130 B2 | 4/2010 | Hanten et al. |
| 7,954,231 B2 | 6/2011 | Meyrahn et al. |
| 7,975,457 B2 * | 7/2011 | Wehrmann ........ B29C 66/83423 53/550 |
| 8,006,463 B2 | 8/2011 | May et al. |
| 8,015,779 B2 | 9/2011 | Topfer |
| 8,272,196 B2 * | 9/2012 | Limousin .............. B29C 66/849 53/547 |
| 8,308,533 B2 | 11/2012 | Haslacher |
| 8,651,162 B2 * | 2/2014 | Christman .......... B29C 66/4322 156/553 |
| 8,713,902 B2 | 5/2014 | Miyamoto |
| 8,820,035 B2 * | 9/2014 | Christman .......... B29C 65/7439 53/375.9 |
| 9,499,289 B1 * | 11/2016 | Uttaro .................. B29C 66/836 |

(56) References Cited

U.S. PATENT DOCUMENTS

| | | |
|---|---|---|
| 9,669,952 B2* | 6/2017 | Whittlesey ......... A22C 11/0245 |
| 2003/0224715 A1 | 12/2003 | Hergott et al. |
| 2005/0053699 A1 | 3/2005 | Whittlesy et al. |
| 2007/0157562 A1 | 7/2007 | Griggs et al. |
| 2007/0180793 A1 | 8/2007 | Meyrahn et al. |
| 2007/0295630 A1 | 12/2007 | Westhovens et al. |
| 2008/0010944 A1* | 1/2008 | Lerner .................. B65B 43/465 53/79 |
| 2008/0245034 A1 | 10/2008 | Topfer |
| 2008/0264515 A1 | 10/2008 | Hanten |
| 2010/0043352 A1 | 2/2010 | Hashimoto et al. |
| 2010/0107565 A1 | 5/2010 | Meyrahn et al. |
| 2010/0112922 A1 | 5/2010 | Freiberger et al. |
| 2011/0045755 A1 | 2/2011 | Topfer |
| 2012/0094588 A1 | 4/2012 | Hanten |
| 2012/0142261 A1 | 6/2012 | Hanten |
| 2012/0204519 A1 | 8/2012 | Mysker et al. |
| 2015/0119218 A1* | 4/2015 | Whittlesey ................ B65B 9/20 493/269 |

FOREIGN PATENT DOCUMENTS

| | | |
|---|---|---|
| DE | 197 16 665 A1 | 10/1998 |
| DE | 102 21 198 A1 | 7/2003 |
| DE | 10 2012 222 261 A1 | 6/2013 |
| EP | 1 059 235 A1 | 6/2000 |
| EP | 0 908 103 B1 | 10/2003 |
| EP | 1 464 224 A1 | 10/2004 |
| EP | 2 380 444 A1 | 10/2011 |
| EP | 2 460 412 A1 | 6/2012 |
| EP | 2 465 353 A1 | 6/2012 |
| EP | 2 567 899 A1 | 3/2013 |
| JP | 60-190329 A | 9/1985 |
| JP | 2001-48108 A | 2/2001 |
| WO | 90/05627 A1 | 5/1990 |
| WO | 95/28089 A1 | 10/1995 |
| WO | 97/32482 A1 | 9/1997 |
| WO | 2010/145713 A1 | 12/2010 |
| WO | 2012/152927 A1 | 11/2012 |
| WO | 2012/152928 A1 | 11/2012 |

OTHER PUBLICATIONS

Aagard, Solutions in Action, Pack Expo 2011, Booth S-5352, Aug. 2011, 2 Pages.
ABB, ABB Motion Control Products, ABB Machine Profile, Vertical Form Fill Seal Machines 2014, 12 Pages.
B&R Horizontal form fill seal systems, 1 Page, [retrieved from the internet on May 23, 2014 at <http://www.br-automation.com/en-us/industries/~ackaging/machines/~rimai:yoackaaina/horizontal-form-fill-seal-svstems/>].
Food Engineering, Technology Timeline, Sep. 23, 2003, 21 Pages, [retrieved from the internet on May 16, 2014 at <http://www.foodenaineerinamaa.com/articles/orint/technoloav-timeline>].
Rockwell Automation Inc., The VFFS (Vertical Form Fill Seal) Machine Application, (2008), 16 Pages.
Winpak, Products Page, Winpak W-630 Vertical Form/Fill/Seal Pouch Machine, 2 Pages, [retrieved from the internet on May 23, 2014 at <http://www.winpak.com/en/products/3-4-1-8.htm>.
Yaskawa, Motion Solutions, Yaskawa Electric America, Inc., Aug. 2006, 8 pages.
International Search Report and Written Opinion for corresponding International Application No. PCT/US2014/062853, dated Feb. 27, 2015, 16 pages.

* cited by examiner

*FULLY ASSEMBLED SEAL UNIT*
*FRONT SIDE ISOMETRIC VIEW*

*FULLY ASSEMBLED SEAL UNIT*
*REAR SIDE ISOMETRIC VIEW*

MOUNT ASSEMBLY VIEW

MOTOR & SEAM COOLER ASSEMBLY VIEW

SEALING UNIT HOME POSITION

**SEALING UNIT
HOME POSITION**

**SEALING UNIT
HOME POSITION**

**SEALING UNIT
RUN POSITION**

**SEALING UNIT
RUN POSITION**

**SEALING UNIT
RUN POSITION**

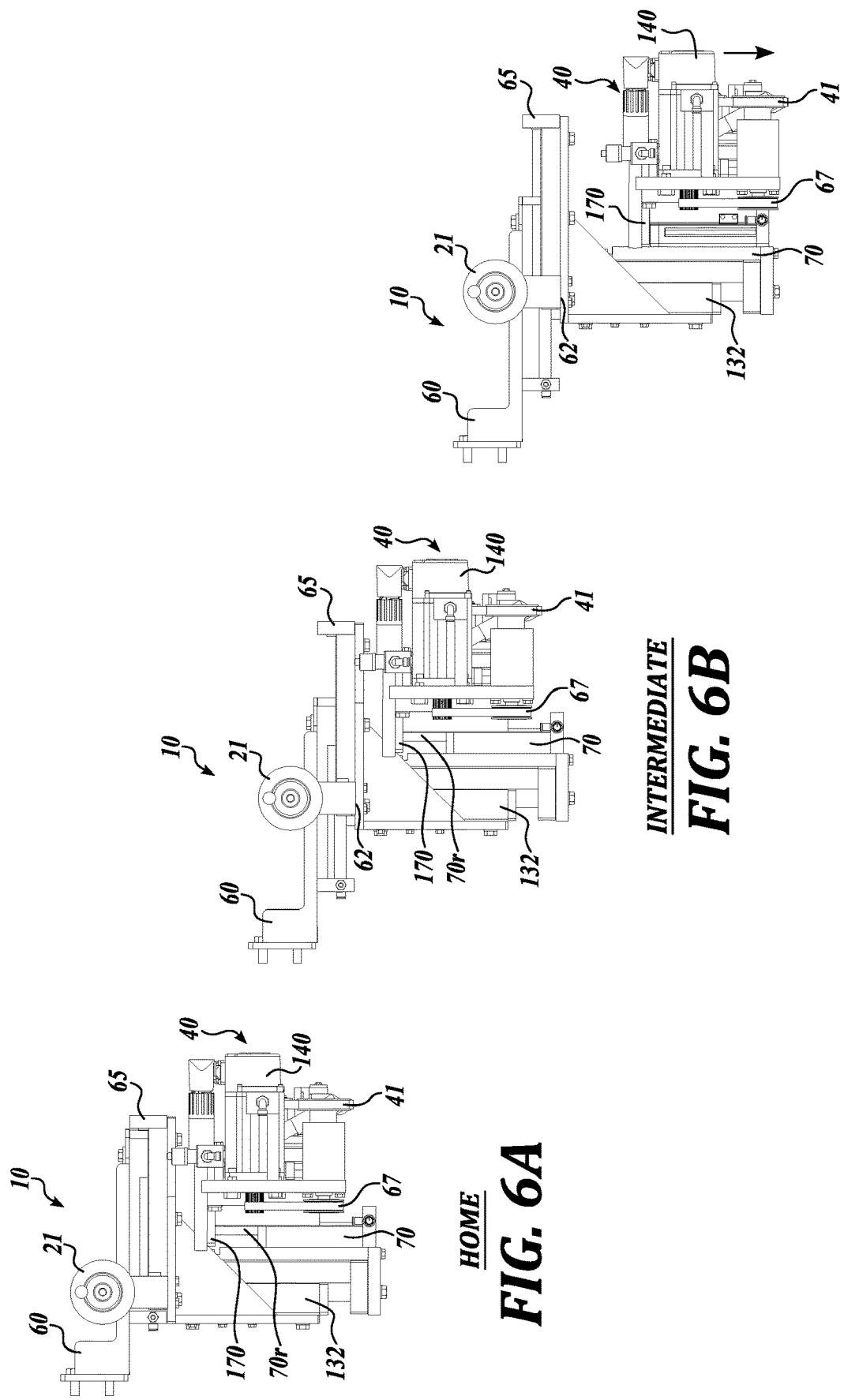

*HOME*

*RUN*

HORN ROTOR OPTION CONFIGURATION

UNIVERSAL DRIVE

SYSTEMS WITH EXTERNAL HEAT-SEAL ASSEMBLY HEIGHT ADJUSTMENT CONTROL AND RELATED SEAL ASSEMBLIES

CROSS-REFERENCE TO RELATED APPLICATION

This application claims the benefit of U.S. Provisional Application No. 62/629,480, filed Feb. 12, 2018, the disclosure of which is hereby incorporated by reference herein in its entirety.

FIELD OF THE INVENTION

The present invention relates to packaging systems that seal flat roll stock into packages.

BACKGROUND OF THE INVENTION

Conventionally, in the production of consumer goods such as, for example, meat or other food products, such products are fed (typically pumped) or stuffed into a casing in a manner that allows the casing to fill with a desired amount of the product. One type of casing is a heat-sealed tubular casing formed by sealing long edges of a thin sheet of flexible material, typically elastomeric material, together. U.S. Pat. Nos. 5,085,036 and 5,203,760 describe examples of automated, high-speed contact sealing apparatus forming flat roll stock into tubular casings. The contents of these patents are hereby incorporated by reference as if recited in full herein.

In conventional packaging systems, the contact sealing apparatus includes a heat-seal band that can require several height adjustments at set-up and/or during operation to generate an adequate seal. In the past, the packaging systems had to be stopped and a front housing guard removed to allow a user to manually adjust an internal height adjustment member to provide suitable and/or improved seals. There is a need for alternate adjustment configurations.

SUMMARY OF EMBODIMENTS OF THE INVENTION

Embodiments of the present invention provide packaging apparatus for producing encased products from flat-roll stock using an external user height adjustment control in communication with or indirectly attached to a heat-seal contact member (typically a rotating heat-seal band) in the housing to allow a user to adjust a vertical height of the heat-seal contact member.

Embodiments of the present application are directed to packaging systems that include a housing, a heat seal assembly with a heat seal contact member held in the housing, and an external user adjustment interface or member in communication with the heat seal assembly. The external user adjustment interface or member directs the heat seal assembly in the housing to translate vertically in response to user input.

The system can include (i) a horizontally oriented rotatable shaft held in the housing either (a) attached to the external user adjustment interface or member or (b) in electromechanical communication with the external user adjustment interface or member, and (ii) a first torque transfer member that may be in the form of a gear or universal drive held on an internal end portion of the shaft.

A rotatable shaft can hold the first gear on the internal end of the shaft and a second in the form of a torque transfer member gear can engage the first gear and be rotatable about a vertical axis of rotation. The second torque transfer member can rotate an underlying screw drive assembly or other type of torque drive assembly, attached to the heat seal assembly to vertically translate the heat seal assembly in response to rotation of the rotatable shaft.

The housing can have a wall with an aperture and the shaft can extend out of the wall through the aperture with the user adjustment interface or member held outside the wall. The aperture has a length sufficient to allow the shaft to move back to front in the housing a distance between HOME and RUN positions. The shaft can have a length inside the housing that is between 6 inches and 4 feet.

The system can include a product horn in the housing under the heat seal assembly. The user adjustment interface or member can be configured to move forward from a HOME position to a RUN position concurrently with the heat seal assembly. In the RUN position, the heat seal contact member of the heat seal assembly can reside over the product horn.

The packaging system can include a motor or the type of an actuator residing over the heat seal assembly in communication with the external user adjustment interface or device. The motor can engage a shaft of a screw drive assembly attached to the heat seal assembly to vertically translate the heat seal assembly.

The system can further include a first mounting bracket with an interior open window space; a second mounting bracket under the first mounting bracket, first and second linear actuators that may be in the form of actuation cylinders residing on the second mounting bracket under and outside of the first mounting bracket open window space; and a motor mounting bracket held by the second mounting bracket and extending above the first mounting bracket through the open window space. The motor and motor mounting plate can translate back to front over the open window space of the first mounting bracket from a HOME to a RUN position.

The system can further include a first mounting bracket with an interior open window space; a second mounting bracket under the first mounting bracket; first and second spaced apart bearing blocks holding the shaft. The second bearing block can reside in the window of the first mounting bracket and the first bearing block can reside on a leg of the second mounting bracket spaced apart from the first mounting bracket to reside closer to a left sidewall of the housing. The system can also include first and second actuation cylinders residing on the second mounting bracket under and outside of the first mounting bracket window.

The first torque transfer member can be a first gear which may be a worm gear or a bevel gear.

The horizontally oriented shaft can reside above a first mounting bracket and is attached to a second mounting bracket that is under the first mounting bracket. The horizontally oriented shaft can translate over an open interior space of the first mounting bracket from a HOME to a RUN position in the housing.

The system can include a third mounting bracket holding the heat seal assembly. The third mounting bracket can be attached to a front portion of the second mounting bracket and in communication with the first and second actuation cylinders so that the first and second actuation cylinders extend and retract the third mounting bracket to move the heat seal assembly between HOME and RUN positions.

The system can include an up/down linear actuator in the form of an actuation cylinder with a rod that extends up and down above a body of the up/down actuation cylinder. The rod can be attached to a mounting member residing behind the third mounting bracket to retract to lower the heat seal assembly to the RUN position.

The system can include screw adjustment assembly attached to the up/down cylinder body with a clamp plate residing in the window of the first mounting bracket and holding a vertically oriented shaft, pin and/or drive screw that engages either the motor or the second gear over the horizontally oriented shaft.

The heat seal contact member can be a rotating band.

The user adjustment interface or member can include a rotatable wheel or crank or other manually operable interface held external to and adjacent a left sidewall of the housing.

The user adjustment interface or member can include a user interface with electronically selectable vertical height controls that resides in a controller accessible by a display providing a Human/Machine Interface of the packaging system.

The system can include a clipper residing downstream of the housing with the heat seal assembly. The housing holding the heat seal assembly can include a left sidewall facing the clipper. The left sidewall can have a (typically horizontal) slot that has a length that is between 2 inches and 24 inches.

The shaft can extend out of the left sidewall through the slot with the user adjustment member held outside the slot external to the left sidewall, and wherein the slot has a length sufficient to allow the shaft to move back to front in the housing a distance between HOME and RUN positions. The shaft can have a length inside the housing that is between 6 inches and 4 feet.

Other embodiments are directed to a seal assembly that includes: a heat seal assembly with a heat seal contact member; and a vertical height adjustment sub-assembly. The vertical height adjustment sub-assembly includes' a horizontally oriented rotatable shaft; a user adjustment member attached to the shaft or in electromechanical communication with the shaft; and gearing or a universal drive is attached to an internal end of the rotatable shaft and is in communication with the heat seal assembly to vertically translate the heat seal assembly in response to user input through the user adjustment member and rotation of the shaft.

The seal assembly can further include: a first mounting bracket with an interior open window, a second mounting bracket under the first mounting bracket; first and second spaced apart bearing blocks holding the shaft, wherein the second bearing block resides in the window of the first mounting bracket and the first bearing block resides on a leg of the second mounting bracket spaced apart from the first mounting bracket to reside closer to a left sidewall of the housing, and first and second actuation cylinders or other type of actuator residing on the second mounting bracket under and outside of the first mounting bracket window.

The user adjustment member can be configured to move forward from a HOME position to a RUN position concurrently with the heat seal assembly.

The shaft can reside above a first mounting bracket and can be attached to a second mounting bracket under the first mounting bracket. The shaft can translate over an open interior space of the first mounting bracket as the second bracket moves from a HOME to a RUN position.

The seal assembly can also include: a third mounting bracket holding the heat seal assembly, the third mounting bracket attached to a front portion of the second mounting bracket and in communication with the first and second actuation cylinders so that the first and second actuation cylinders extend and retract the third mounting bracket to move the heat seal assembly between HOME and RUN positions; an up/down actuation cylinder with a rod that extends up and down above a body of the up/down actuation cylinder or other type of actuator, the rod can be attached to a mounting member residing behind the third mounting bracket to retract to lower the heat seal assembly to the RUN position; and a screw adjustment assembly that can be attached to the up/down cylinder body with a clamp plate residing in the window of the first mounting bracket and holding a shaft, pin and/or drive screw that engages the second drive gear.

The heat seal contact member can include a heat-seal band.

Other embodiments are directed to methods for sealing flat roll stock into shaped casing for encasing target products. The methods include: (a) providing a packaging system with an external user adjustment interface or member; (b) automatically pulling casing from a roll of flat stock through a forming collar to form a tubular shaped casing; (c) automatically contacting the tubular shaped casing with a heat seal contact member of a heat-seal assembly, (d) automatically sealing long edge portions of the casing together based on the contacting; (e) accepting user input through the external user adjustment interface or member to direct a heat seal assembly vertically down or otherwise toward the casing to alter an operative RUN position of the heat-seal contact member; and (f) then automatically moving the heat seal assembly in response to the accepted user input.

The external user adjustment interface or member can be an external wheel, crank or other device or member attached that is attached to a horizontally oriented rotatable shaft that rotates to vertically move the heat seal assembly down. The method can also further include translating the wheel from a HOME position to a forwardly extended INTERMEDIATE or RUN position concurrently with translating the heat seal assembly from the HOME to the INTERMEDIATE or RUN position.

The accepting user input can be carried out using an electronic user interface as the external user adjustment interface or member.

The automatically moving can be carried out using a motor or other actuator directly or indirectly attached to a drive shaft of a drive screw assembly or other type of torque drive residing behind the heat seal assembly to move the heat seal assembly down a distance of between 0.1 mm to 25 mm.

The motor can be held above the drive shaft of the drive screw assembly on a mounting bracket holding first and second laterally extendable actuators. The method can further include concurrently translating the motor with the heat seal assembly from a HOME position to a forward INTERMEDIATE and/or RUN position while keeping the MOTOR at a fixed vertical position.

The accepting user input can include rotating an external wheel to rotate a shaft, which rotates a first gear attached to an internal end of the shaft about a horizontal axis of rotation in response to rotation of the external wheel, which rotates a second gear in communication with the first gear about a vertical axis of rotation to vertically move the heat seal assembly up or down.

One revolution of the wheel can vertically moves the heat seal assembly up or down between 0.1 mm and 5 mm.

The heat seal assembly can be held enclosed inside a housing. The accepting user input can be carried out while the housing remains closed with the heat-seal assembly in the RUN position and in an active RUN operational mode to thereby allow an operator to adjust the height of the heat-seal contact member without requiring physical access to an interior of the housing, and optionally the heat-seal contact member is a heat-seal band.

The accepting user input through the external user adjustment interface or member can be carried out accepting user input via the user adjustment interface which is electronically provided as part of the Human Machine Interface of the packaging machine.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIGS. 6A-6C are end views of the seal unit in respective HOME, INTERMEDIATE and RUN configurations according to embodiments of the present invention.

DETAILED DESCRIPTION

Figure 1A:
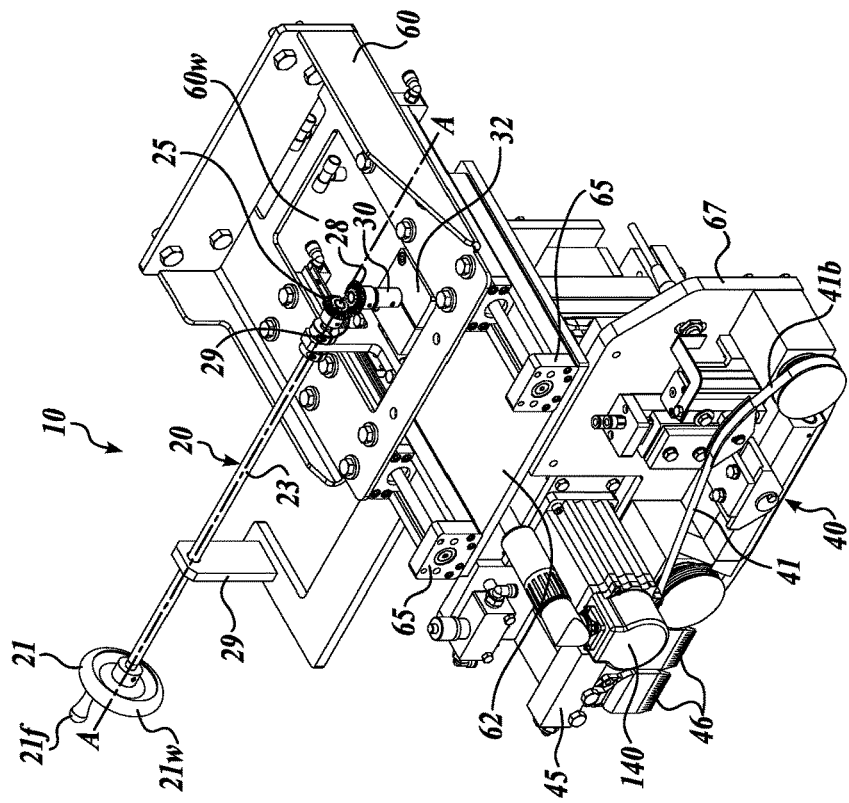
FIG. 1A is a front side perspective view of an assembled seal assembly according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. The term "FIG." (whether in all capital letters or not) is used interchangeably with the word "Figure" as an abbreviation thereof in the specification and drawings. In addition, the sequence of operations (or steps) is not limited to the order presented in the claims unless specifically indicated otherwise.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components including walls of a housing or enclosure. The frame can be a floor mount frame. The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The present invention is particularly suitable for producing encased products that may also employ closure clips to seal products held in the casings. The product may be a linked chain of elongated extruded product held in a casing. The casing can be any suitable casing (edible or inedible, natural or synthetic) such as, but not limited to, collagen, cellulose, plastic, elastomeric and/or polymeric casing. Typically, the casing material is elastomeric and/or polymeric planar roll stock. The elastomeric and/or polymeric sheet is a relatively thin sheet (or film) of roll-stock that can be formed in situ into a continuous length of heat-sealed and/or otherwise joined or seamed tubular casing. Embodiments of the invention are configured to seal laminated or multi-layer films. The multi-layer films can comprise different materials, typically one material as a first layer and a second material as an overlying second layer. The different materials can be laminated or one layer can be a coating such as a metalized spray coating. The laminated or multi-layer films can include foil film\ metalized polymeric and/or elastomeric films, such as aluminized plastic and/or aluminized polymeric films. In some embodiments, the films can comprise heat-shrink films.

The term "film" means the material is thin. The thickness is typically under about 0.5 mm, such as in a range of between about 0.02 mm to about 0.3 mm, typically between about 0.03 mm to about 0.13 mm. In some embodiments, the film can have a thickness that is about 0.03 mm, about 0.04 mm, about 0.05 mm, about 0.06 mm, about 0.07 mm, 0.08 mm, about 0.09 mm, about 0.10 mm, about 0.11 mm, about 0.12 mm, about 0.13 mm, about 0.14 mm, about 0.15 mm, about 0.16 mm, about 0.17 mm, about 0.18 mm, about 0.19 mm, about 0.20 mm, about 0.25 mm, about 0.30 mm and the like. However, the casing can have other thicknesses.

The forming can be carried out substantially automatically and continuously over a desired interval (typically between at least about 45-60 minutes, depending on the size of the length of the roll stock). The sealing can be performed using a heat seal. The seal can seal a seam formed by joining two outer long sides of the casing/film. The seam can be a flat, fin, or other overlapping and/or abutting joint configuration.

The encased elongated or tubular product can be an elongated food product, typically a meat product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other products in casing materials. Examples of other products include pasty products such as caulk or sausage or powders such as granular materials including grain, sugar, sand and the like or other flowable materials including wet pet food (similar to that held conventionally in cans) or other powder, granular, solid, semi-solid or gelatinous materials including explosives. Thus, embodiments of the invention can be used for packaging target products for any industry including food, aquaculture, agriculture, environmental, building or home maintenance supplies, chemical, explosives, or other applications.

Figure 7:
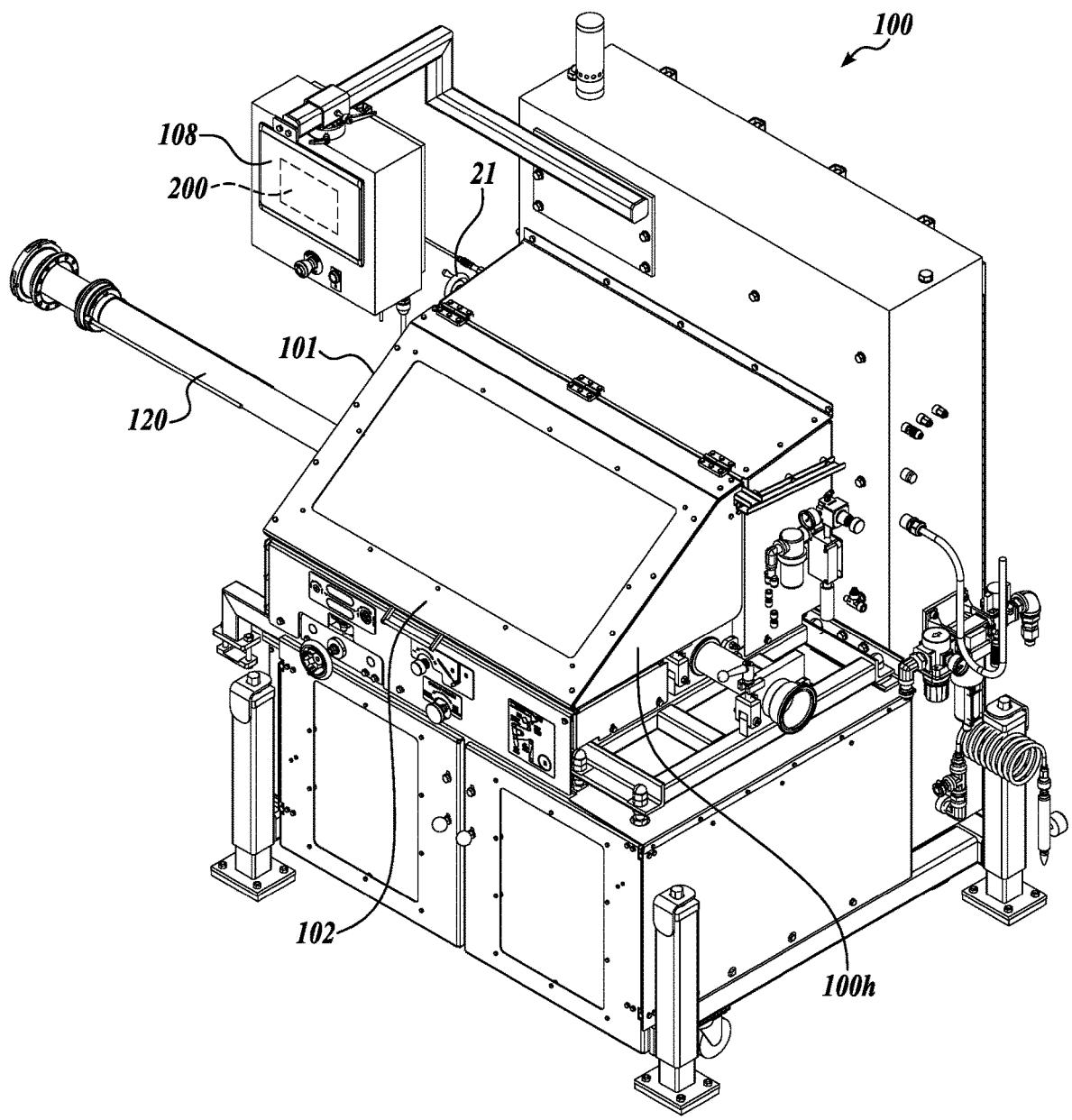
FIG. 7 is a front perspective view of an exemplary packaging machine with a heat-seal assembly according to embodiments of the present invention.
Figure 8A:
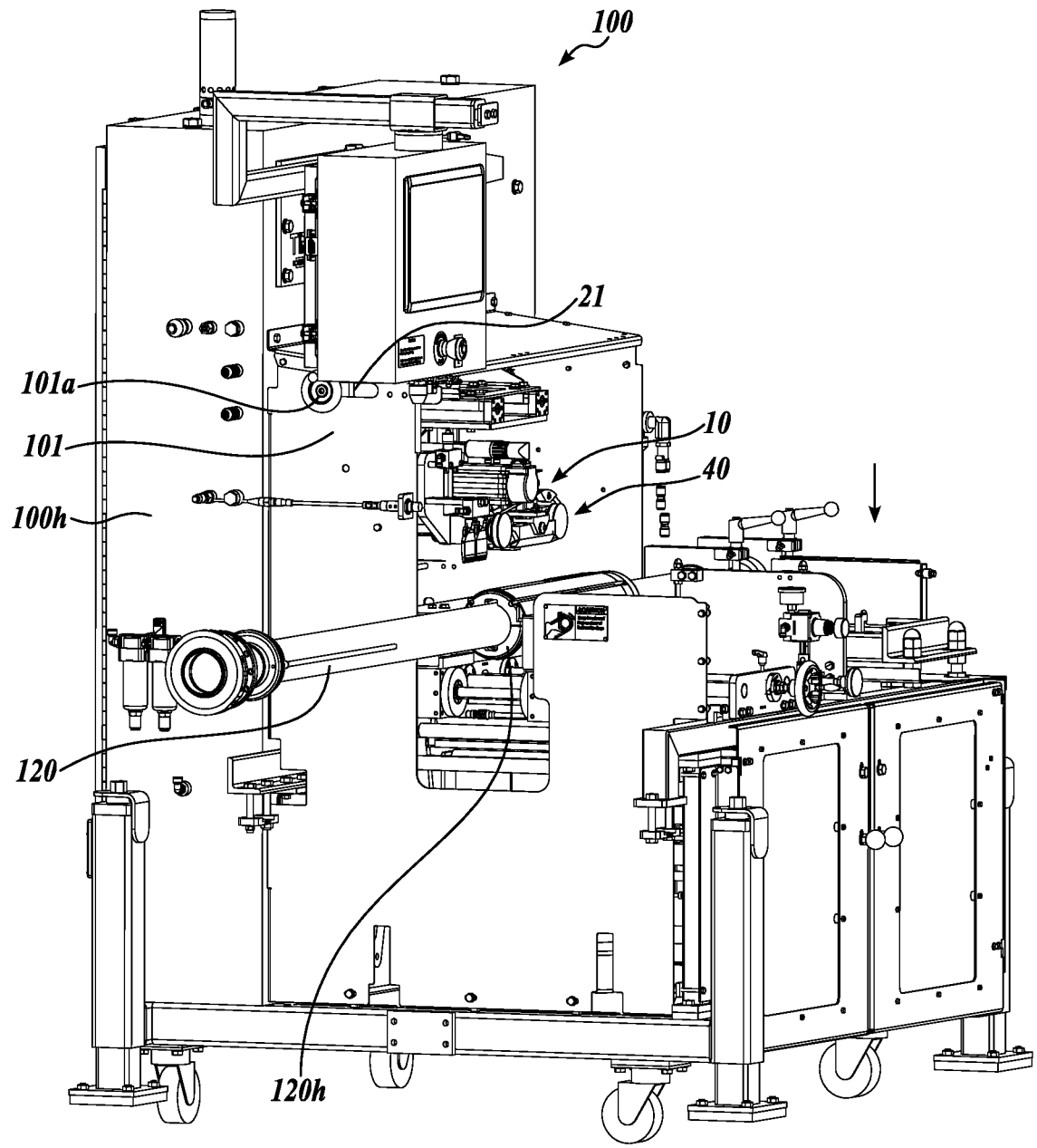
FIG. 8A is a side perspective view of the packaging machine shown in FIG. 7 with the seal assembly in an exemplary HOME configuration and with certain components such as housing guards omitted according to embodiments of the present invention.
Figure 8B:
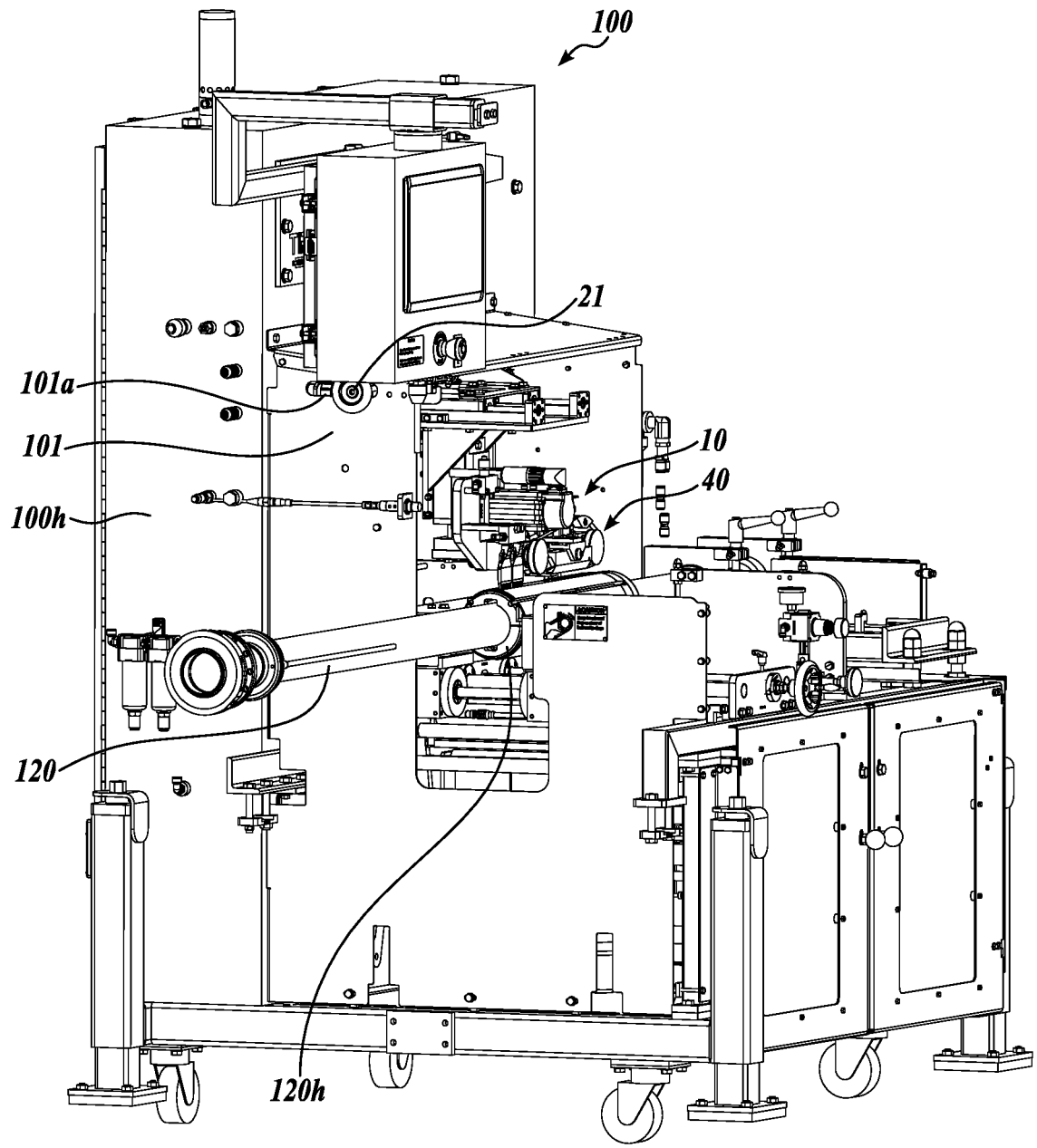
FIG. 8B is a side perspective view of the packaging machine shown in FIG. 8A with the seal assembly in an exemplary RUN configuration according to embodiments of the present invention.

Referring to FIGS. 1A, 1B, 2 and 3, a seal assembly 10 (also referred to as a "seal unit") is shown with a vertical height adjustment sub-assembly 20 for a heat-seal assembly 40. The height adjustment sub-assembly 20 comprises an external user adjustment interface or member 21. The external user adjustment interface or member 21 can be external to the housing 100h enclosing the heat-seal assembly 40 (FIGS. 7, 8A, 8B). In some embodiments, the external user adjustment interface or member 21 is exposed to environmental conditions to be physically accessible by a user when the housing 100h of a packaging apparatus 100 (FIGS. 7, 8A, 8B) that encloses the seal assembly 10 is closed during operation of the packaging machine 100, requiring no start and stop of the packaging machine 100 (FIGS. 7, 8A, 8B) and/or no stop of production of the flat roll stock into sealed film operation while allowing a user access to the height adjustment member 21 to vertically adjust the height of the heat seal contact member 41 of the heat seal assembly 40 "on the fly" (while the machine is operational without requiring power down) and/or in situ.

The user adjustment interface or member 21 can be held inside a cover 110 that can be opened for access independently of the front housing guard 102 of the housing 100 (FIG. 11) The cover 110 (FIG. 11) can be pivotably attached to the housing 100h or may slide or otherwise open to allow a user access to the user adjustment interface or member 21 without opening the front guard 102 of the housing 100 (FIGS. 7, 11) The position and configuration of the user adjustment interface or member 21 allows a user to adjust a height of the heat seal assembly 40 and/or heat-seal contact member 41 without requiring direct physical access to the interior of the housing 100 (FIG. 7). In some embodiments, the user adjustment interface or member 21 comprises an electronic external user interface control that may be held in a PLC of an HMI of the packaging apparatus or in a controller/processor at another location (see, e.g., FIGS. 12A/12B, 17).

Figure 1B:
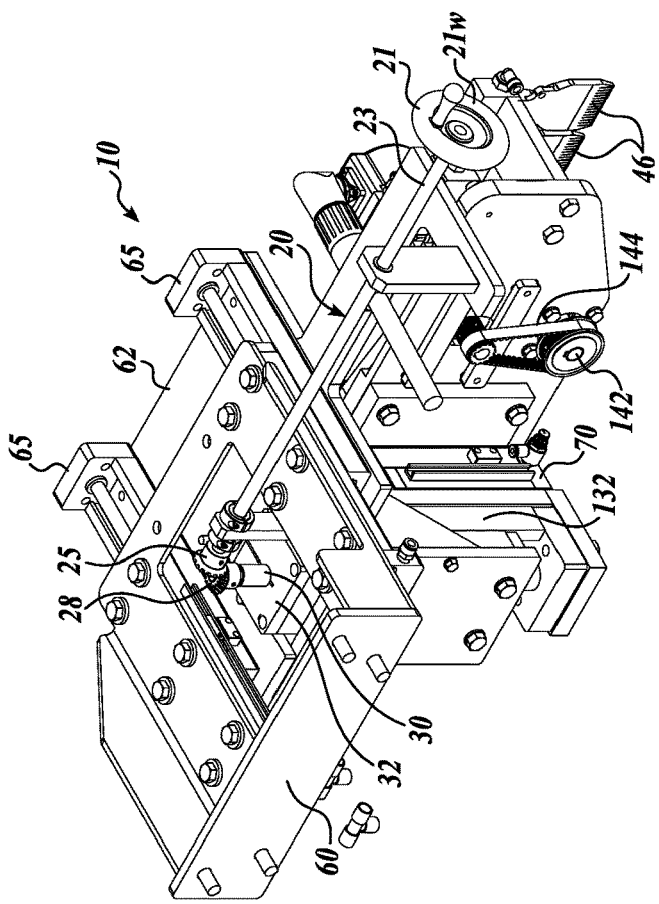
FIG. 1B is a rear side perspective view of the seal assembly shown in FIG. 1A.

The term "external" refers to a user adjustment interface or member 21 that is external to an interior cavity of a housing or cabinet enclosing the heat seal assembly 40. The external user adjustment interface or member 21 can have any suitable configuration and can be manually operated or semi-automatic based on user/operator control, direction. As shown in FIGS. 1A and 1B, for example, the user adjustment interface or member 21 comprises a rotatable external wheel or circular handle 21w with an optional thumb or finger grip 21f. The handle 21w can be replaced by a crank or other type of manually operable member or device.

As shown in FIGS. 1A, 1B, 2 and 3, the heat-seal assembly 40 can comprise an endless heat-seal band 41b as the heat-seal contact member 41. The heat-seal band 41b can be in communication with a motor 140 or other type of motor device that engages a belt 141 which drives a pulley 142 (FIG. 1B) for continuously rotating the heat-seal band 41 to seal the casing seam U.S. Pat. Nos. 5,085,036 and 5,203,760 describe examples of automated, high-speed contact sealing apparatus forming flat roll stock into tubular film casings. The contents of these patents are hereby incorporated by reference as if recited in full herein. It is contemplated that other heat-seal heater configurations or assemblies may be used. For example, adhesive sealing systems can be used with a heat-seal band. Suitable heat-seal units with heat bands, motors, actuators and screw assemblies are available from TOSS Machine Components, Inc., Nazareth, Pa as part number 13116407.

It is also noted that while the heat seal assembly 40 is shown as comprising the heat-seal band 41b, it is contemplated that the height adjustment sub-assembly 20 can also be suitable for other heater types, typically contact heat sealers such as those comprising rollers, for example.

Referring again to FIGS. 1A, 1B, 2 and 3, the sub-assembly 20 can include an elongate shaft 23 that can be horizontally oriented. The shaft 23 can have a first end portion that extends out an aperture 101a (i.e., a slot) in an upstanding wall 101 of the housing 100h (FIGS. 8A, 8B) so as to allow the external user adjustment member 21 to laterally travel (in a back to front direction orthogonal to the product horn 120, FIG. 7, 8A) a distance between HOME and RUN positions. In some embodiments, the shaft 23 can extend out an aperture 101a in a left side wall 101 as shown in FIGS. 8A and 8B (the wall facing a clipper 175, FIG. 10) The aperture can have arcuate end portions and be horizontally oriented in a direction orthogonal to the product horn 120. However, the shaft 23 may be configured to extend out the right side wall, the back, ceiling or even the front of the housing (not shown) and attach to a first internal gear 25 to provide user access while the housing 100h remains closed. The shaft 23 can have a length "L" (FIG. 5C) that is typically from about 6 inches to about 4 feet long, more typically from about 12 inches to about 24 or to about 18 inches long. The user adjustment member 21 can reside closely spaced apart from an external wall 101, typically from 0.25 inches to 3 inches.

The elongate shaft 23 can hold or be in communication with the user adjustment member 21 on one end and can be attached to a first internal gear 25 or other type of torque transfer device on the other end. The first internal gear 25 can have an axis of rotation A-A (FIG. 1A) that is horizontal. The first internal gear 25 can be aligned with a second internal gear 28 or other type of torque transfer device. The second internal gear 28 can have an axis of rotation that is vertical. Thus, rotation of the shaft 23, rotates the first gear 25, which rotates the second gear 28, which then turns a screw drive 31 (FIG. 2, 13A) that vertically adjusts a height of the heat-seal assembly 40 and/or at least the heat-seal band 41.

Where the heat-seal is carried out over a top of horn 120, the height adjustment of the heat-seal assembly 40 typically occurs at set-up where a height is adjusted (moved up or down) when a product size changes. If the product diameter increases from an immediately prior product produced by the packaging machine 100 (FIG. 7), the heat-seal contact member/device 41, i.e., heat-seal band 41 needs to be raised. If the product diameter decreases, the band 41 needs to be lowered. Thus, while set-up for a particular product size is the primary opportunity for adjusting height it can be difficult to precisely select a correct height prior to running film; thus upon startup, an operator may need to adjust the heat-seal contact member 41 up or down slightly (i.e., from about 01 mm to about 2 mm) based on the integrity of seal. Thus, being able to make this adjustment while running is believed to provide a great improvement over having to stop operation and open a housing guard 102 to make the vertical height adjustment. A visual inspection of the seal while running can inform the operator if the seal is too hot (heat-seal member 41 is too low) or not sealed enough (heat-seal member 41 is too high). Also, just downstream from the seal assembly 10 can be a clipping machine (also called a "clipper") 175 (FIG. 10) and the seal will be put under pressure when the product is stuffed into the casing and that can also give the operator feedback on how strong the seal is.

The first and second gears 25, 28 can be bevel gears, but other gear configurations and/or other rotary to linear motion conversion devices can be used. In some embodiments, the first and second gears can have a 1:1 ratio so that one revolution of the first gear 25 causes one revolution of the second gear 28. In some embodiments, one revolution of the gears 25, 28 and/or the rotatable user adjustment member (i.e., wheel) 21 can move the heat-seal contact member 41 between about 0.5 mm to about 2 mm, typically about 1.5 mm.

FIGS. 1A, 1B, 2 and 3 show the seal assembly 10 can include an upper mounting bracket 60 over a lower mounting bracket 62 which sandwich first and second actuators 65, typically pneumatic actuators or pneumatic cylinders, therebetween. A third upright mounting member 67 (shown as a vertically oriented plate) can be attached to the first and second actuators 65 and can hold components of the heat-seal assembly 40, shown as the motor 140, heat seal band 41b, and optional heat seal cooler 45 with optional nozzle brushes 46. The heat seal cooler 45, where used, can blow compressed air onto the heated seal. The heat seal cooler 45 is optional and may have other configurations and/or be other cooling types.

Figure 4A:
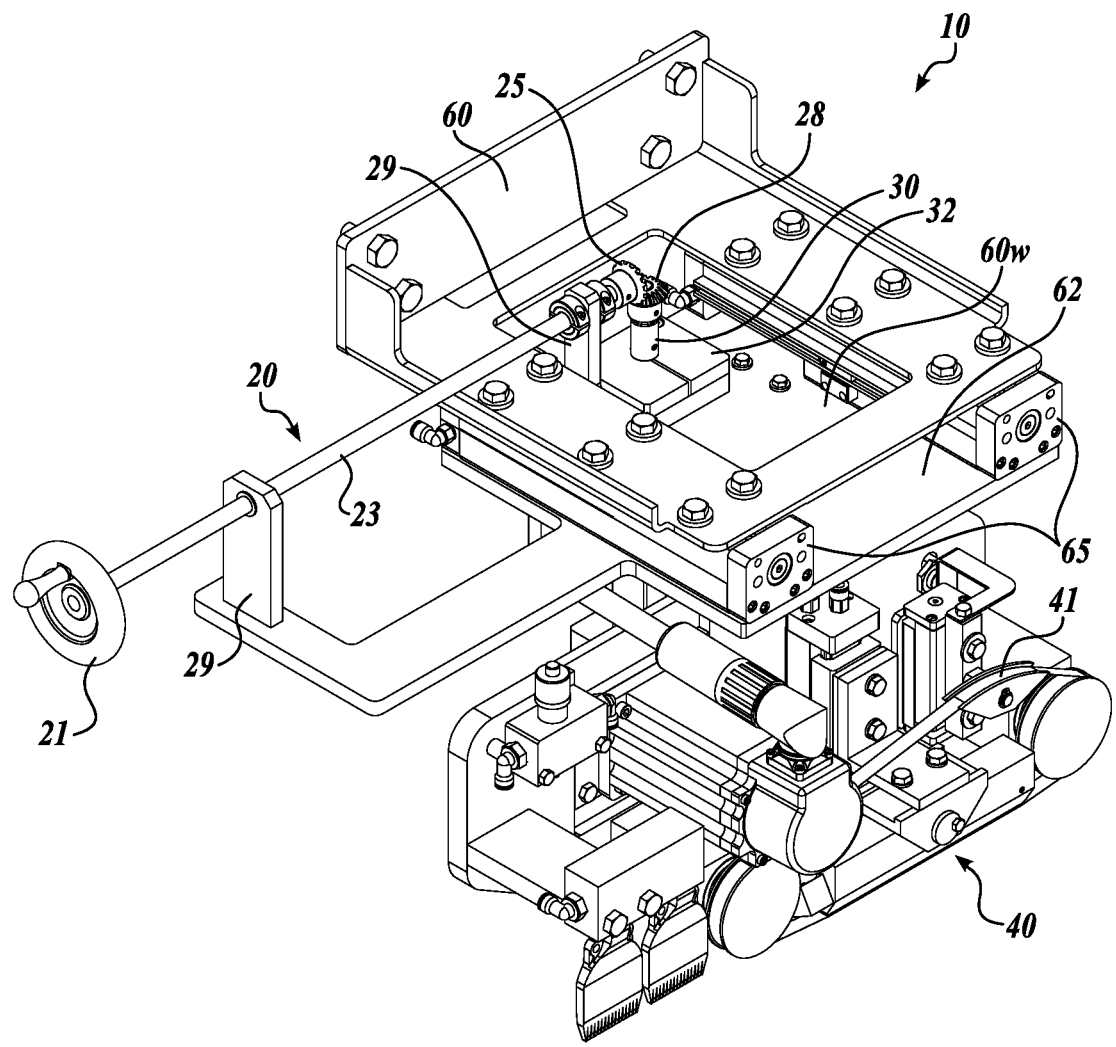
FIG. 4A is a front, side perspective view of the seal unit shown in FIG. 1A in a "HOME" position/configuration according to embodiments of the present invention.
Figure 4B:
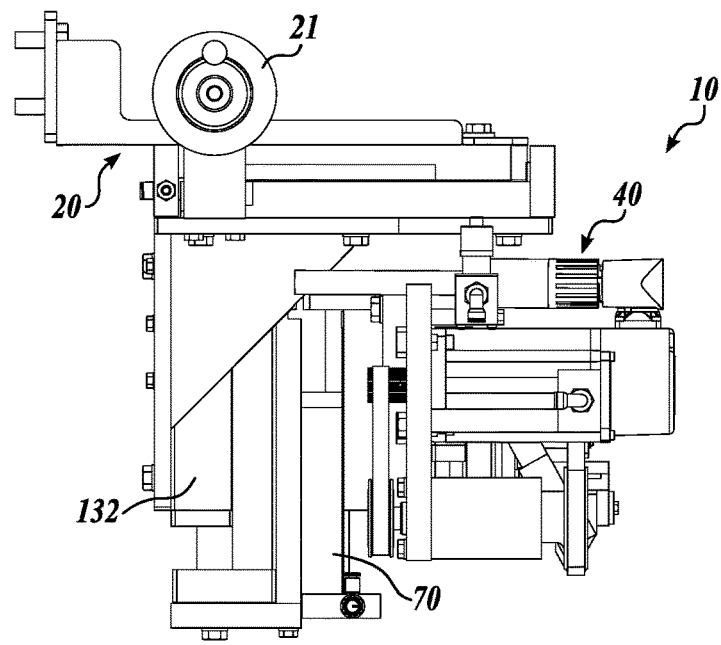
FIG. 4B is an end view of the seal unit of FIG. 4A.
Figure 4C:
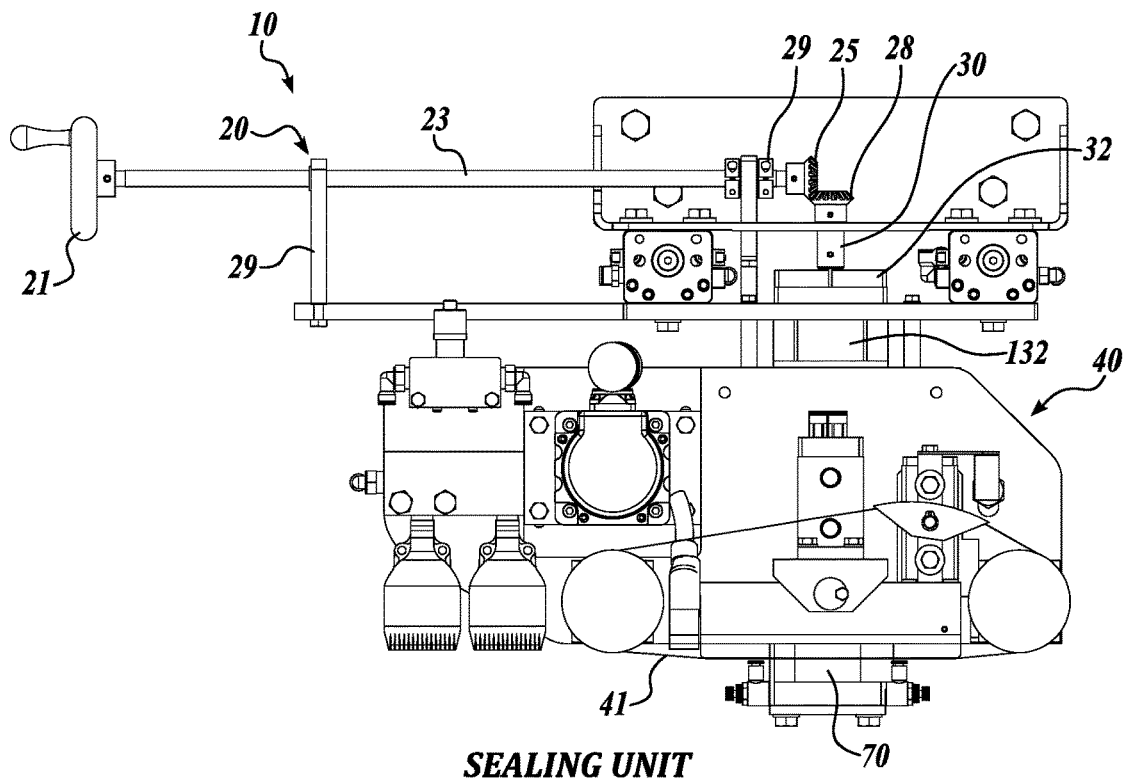
FIG. 4C is a front view of the seal unit of FIG. 4A.
Figure 5A:
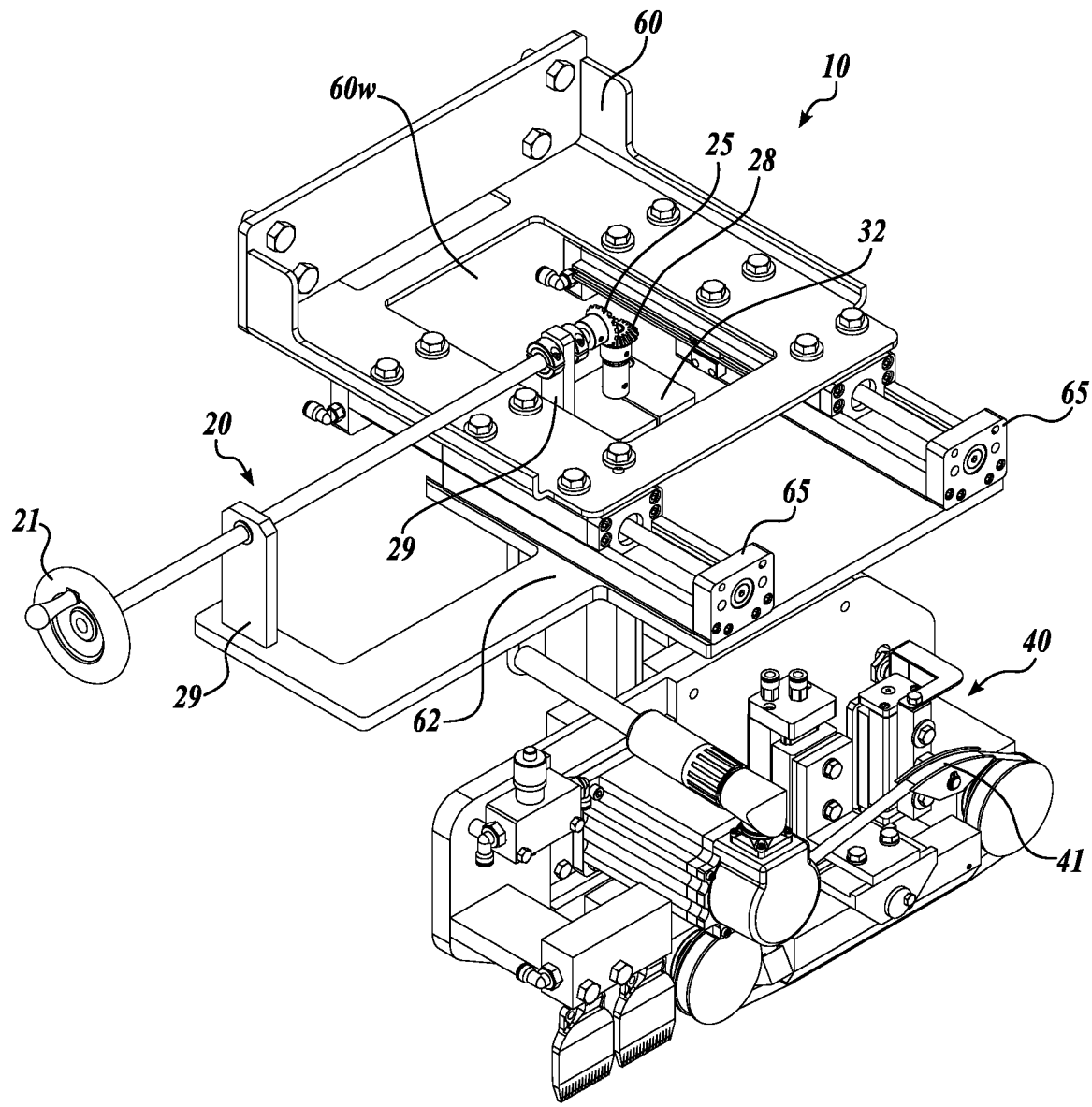
FIG. 5A is a front, side perspective view of the seal unit shown in FIG. 1A in a "RUN" position/configuration according to embodiments of the present invention.
Figure 5B:
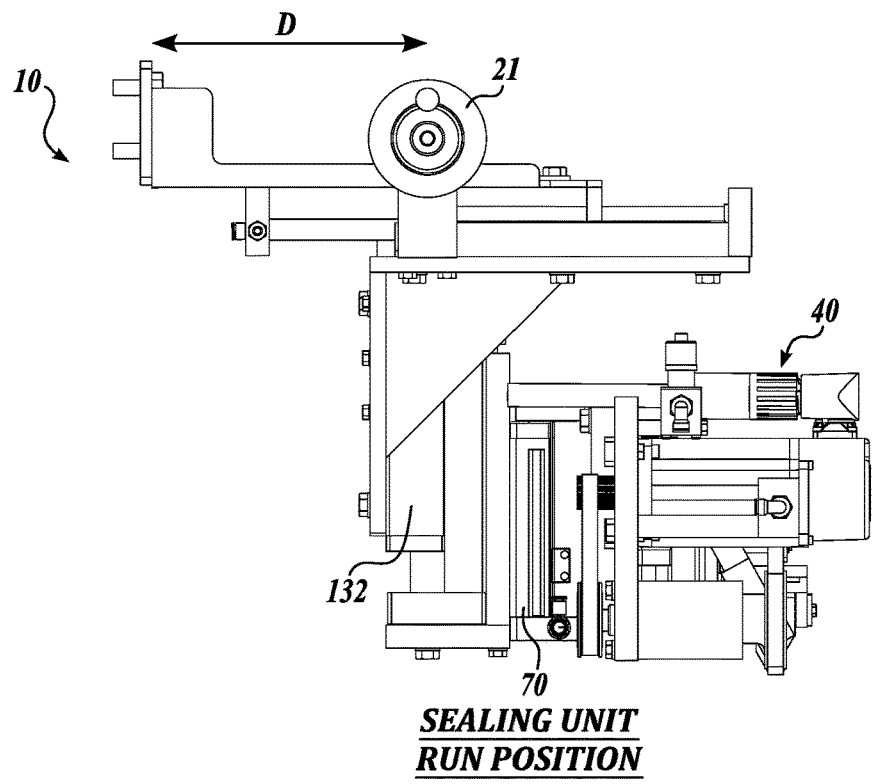
FIG. 5B is an end view of the seal unit of FIG. 5A.
Figure 5C:
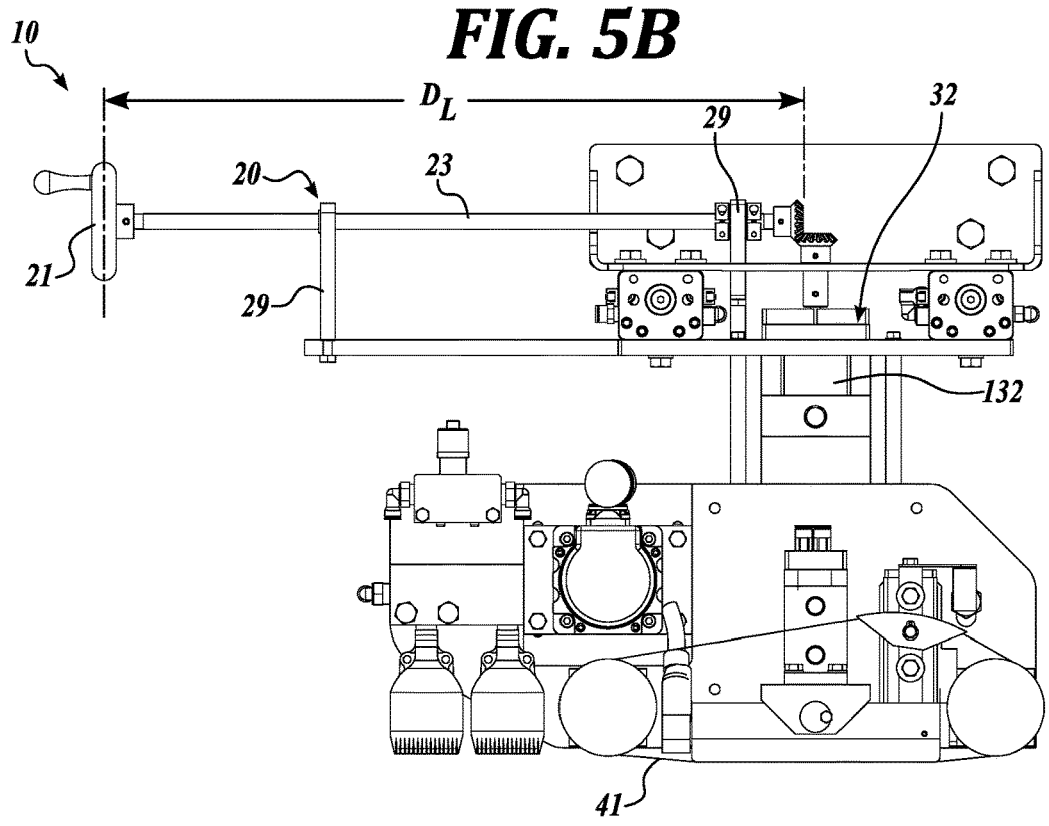
FIG. 5C is a front view of the seal unit of FIG. 5A.

As shown in FIGS. 4A-4C and 5A-5C, the actuators 65 can automatically move the heat-seal assembly 40 between extended and retracted positions (front to back, back to front), with the retracted position being associated with a HOME position, away from the product horn 120 and the extended position being associated with a RUN position with the heat seal contact member 41 lowered and forward relative to the HOME position (FIGS. 5A, 5B). FIGS. 4A-4C illustrate the sealing assembly 10 in an exemplary HOME position. FIGS. 5A-5C illustrate the sealing assembly 10 in an exemplary RUN position.

As shown in FIGS. 1A, 1B, 4B, 4C, 5B, 5C, and 6A-6C, the seal assembly 10 can also include an up/down actuator or cylinder 70 with a rod 70r that resides behind the third mounting member 67 attached to a mounting member 170 that is attached to and moves the third mounting member 67 with the heat seal assembly 40 between a raised/extended HOME position and a lowered/retracted RUN position.

Figure 2:
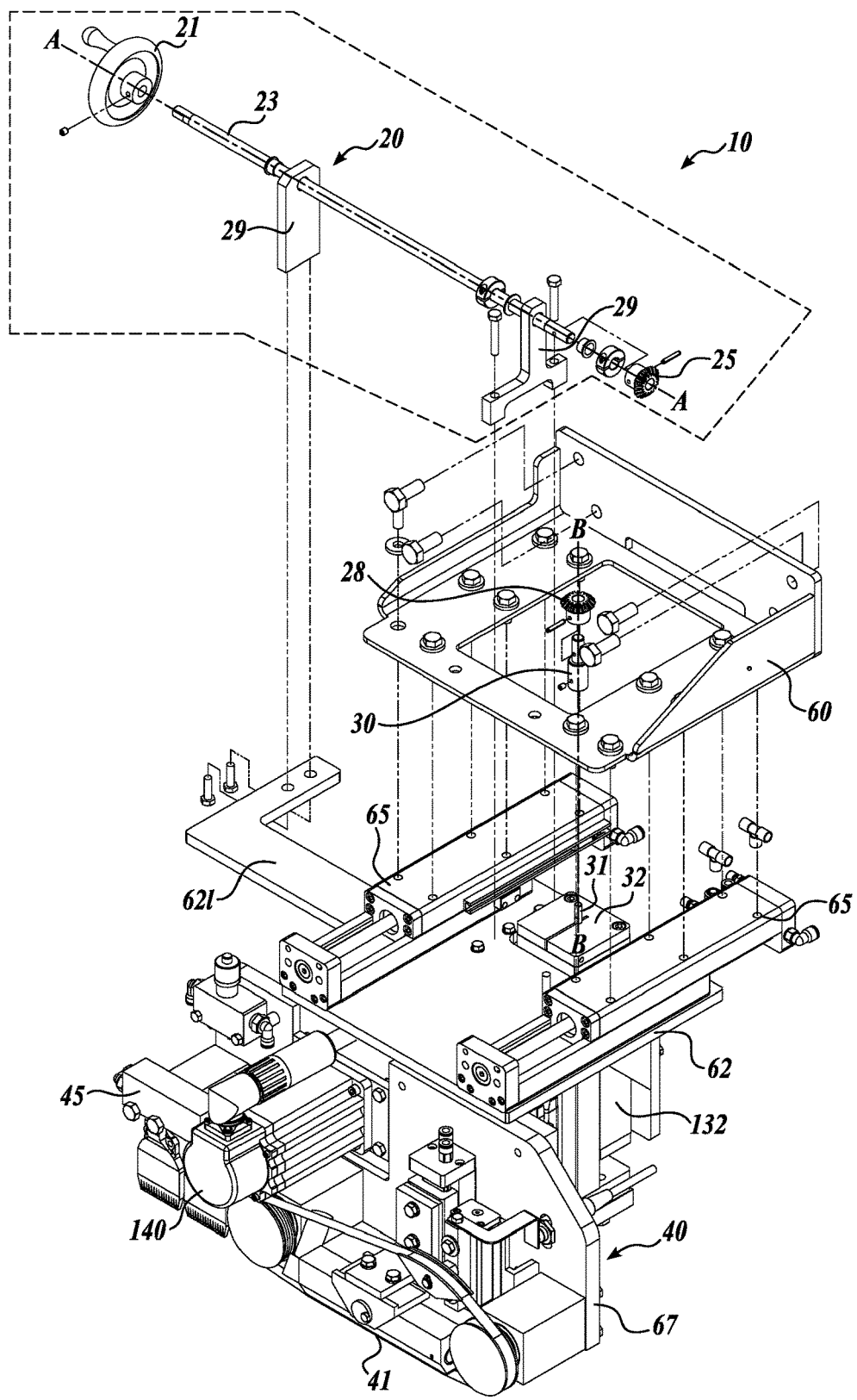
FIG. 2 is a partial exploded view of the seal assembly shown in FIG. 1A.
Figure 3:
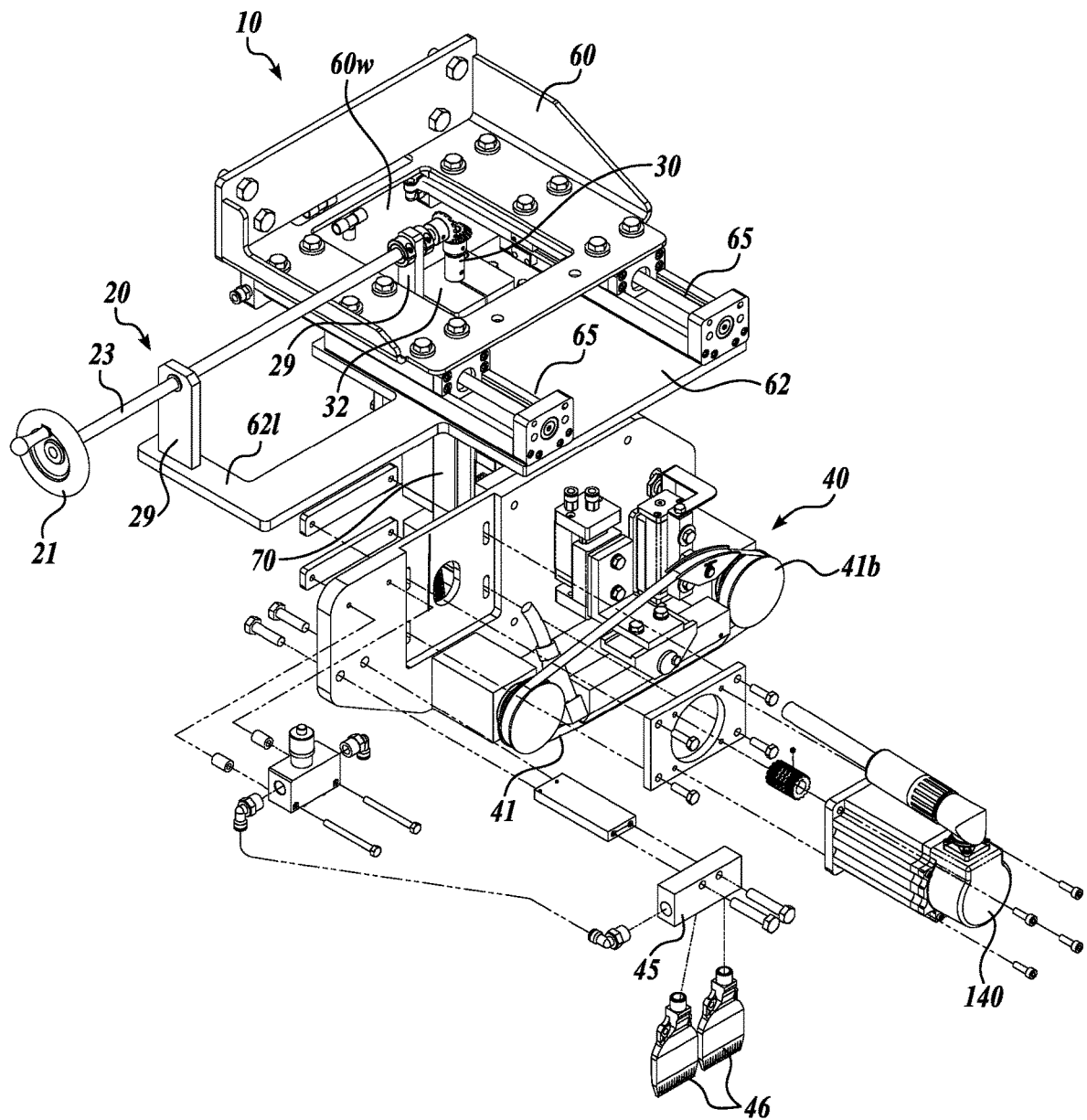
FIG. 3 is another partial exploded view of the seal assembly shown in FIG. 1A.

The upper mounting bracket 60 can be stationary and attached to the frame and/or housing 100h of the packaging system 100. The upper mounting bracket 60 can have an open interior window 60w. A split plate/friction clamp 32 can hold the shaft 31 inside the window 60w. The friction plate 32 can act as a brake to keep the shaft 31 from turning while the packaging system is running/operative. The friction clamp 32 can be part of a screw drive assembly 132 or other type of drive assembly, or part of the lower mounting plate 62 and can hold the vertical screw drive 31 which engages the second gear 28. The second gear 28 can be attached to a drive shaft 30 over the screw drive 31 (FIG. 2).

As is well known in conventional seal units, the vertical height screw adjustment assembly 132 can include the friction clamp 32 which can remain vertically stationary and an exposed height of the vertical screw drive 31 above the friction clamp 32 can remain constant. Referring to FIGS. 6A-6C, and FIGS. 13A and 13B, for example, the friction clamp 32 can reside behind the third mounting bracket 67, attached to and behind the up/down cylinder 70 and can attach to a slide rod assembly 133 with an internal screw 133s (FIG. 13A) that attaches to the screw drive 31 (below the bevel gear 28 and under the friction plate 321 and that is attached to the heat seal assembly 40 for adjusting a height of the heat seal assembly 40. This screw adjustment assembly 132 can be used both to set the height of the heat seal assembly 40 based on the product size and allow a finer adjustment when the heat seal assembly 40 is in the RUN position.

To be clear, while a screw drive/screw adjustment assembly 132 is described herein as an example of a vertical height adjustment system, other linear drive systems may be used as will be understood by those of skill in the art.

In some embodiments, after the heat seal assembly 40 is lowered to be adjacent the product horn 120, a user can use the external user height adjustment control/interface 21 to further lower the heat seal assembly 40 over the horn 120 for a finer positional adjustment from an automated movement from the up/down actuator 70, typically from 0.1 mm to 25 mm, optionally while being able to visually see the downward movement.

The height adjustment sub-assembly 20 can attach to right and left bearing blocks 29 (i.e., upright support members for the rotatable shaft 23) which can move forward and rearward with the heat-seal assembly 40. The bearing blocks 29 can be attached to the lower mounting plate 62. The lower mounting plate 62 can include a left side leg 62 that holds the left side bearing block 29. The right side bearing block 29 can be held in alignment with the left side bearing block 29 inside the window 60 adjacent the friction plate 32 and/or second gear 28.

FIGS. 4C and 5C illustrate that the shaft 23 and the gears 25, 28 can remain at a fixed, constant vertical height (in the housing 100h) irrespective of the HOME or RUN positions of the seal assembly 10.

FIGS. 6A-6C illustrate three different configurations/positions that the seal unit 10 can have including the HOME position (FIG. 6A), a RUN position (FIG. 6C), and an intermediate position between the HOME and RUN positions where the heat-seal assembly 40 is extended forward but not lowered for the RUN position. The HOME position is a stowed or non-use position which positions the heat assembly 40 closer to a back wall of the housing 100h and a distance above a product horn 120 relative to an INTERMEDIATE or RUN position. The "RUN" position is a position that places the heat seal contact member 41 over a product horn 120 to be in operative position to contact, heat and thereby seal casing as it is pulled or otherwise travels thereunder. The INTERMEDIATE position extends the heat seal assembly 40 over the product horn 120 but does not lower the seal assembly 40 into a RUN operative position to allow the heat seal contact member 41 to contact the casing and/or horn 120.

The user adjustment member 21 can automatically travel forward (and backward) a distance "D" (FIG. 5B) with the heat seal assembly 40, while held on the lower mounting member 62. During the forward stroke cycle, the shaft 23 can move forward above the window 60w (compare FIG. 5A with FIG. 5A) of the upper mounting member 60 while the upper mounting member 60 is stationary. The front to back (and back to front) stroke distance of the shaft 23 (and typically the user adjustment member 21) between HOME and RUN positions (and RUN and HOME positions), i.e., a direction that is orthogonal to the product horn 120 (FIGS. 7, 8A), can be between 2-36 inches, more typically from 6 to 18 inches, such as about 3.5 inches or 80 mm at least for some product horn sizes, by way of example.

In some embodiments, the packaging system 100 can include an affirmative third stop position which is the Intermediate position shown in FIG. 6B with the heat seal assembly 40 forward over and a distance above the product horn 120 before moving to the RUN position with the heat seal assembly lowered closer to the product horn 120.

Turning now to FIGS. 7, 8A, 8B, 9A, 9B and 10, exemplary packaging apparatus 100 using a seal assembly 10 configured to form seamed tubular casings from flat roll stock are shown. The apparatus 10 includes a horn 120, a forming collar 160, the seal assembly 10 comprising the heat-seal assembly 40, and a film drive assembly 145. The film drive assembly 145 can optionally include vacuum drives with belts (FIGS. 9A, 9B, 10) that contact opposing sides of the casing on the horn 120 to pull the casing forward.

However, other film drive assemblies can be used. The film drive assembly 145 can be configured to operate with an adjustable drive speed to pull flat stock casing/film from a roll of flat casing as is well known to those of skill in the art. The term "film drive assembly" and derivatives thereof means the drive system for driving any casing material and is not limited to driving "film".

The packaging system 100 can comprise a clipper 175 (FIG. 10) which can be a single clipper system or a multi-clipper system. See. e.g., U.S. Pat. No. 8,006,463, the contents of which are hereby incorporated by reference as if recited in full herein.

The drive speed can be such that the casing is advanced over the forming collar 160 and through the heat-seal assembly 40 at a desired speed. The speed can vary depending on machine, drive systems, casing and products. The speed may be between about 20 ft/min to about 400 ft/min, but other speeds may be possible. For some particular embodiments, the speed may typically between about 20-300 ft/min, more typically between about 20 ft/min to about 150 ft/min. In the upper end of this range, the long ends of the casing are typically under the heat-seal contact heater 41 for a short time of between about 0.1 second to about 0.5 seconds. For example, at a rate that is about 150 ft/min, the exposure to the heat-seal contact member 41 can be, for example, about 0.2 seconds.

The packaging machine 100 can include a controller 200 (FIG. 7) that can be held in an HMI (Human Machine Interface) 107 with at least one processor (typically comprising a programmable logic controller "PLC") and with a display 108 of menu options allowing a user to select. (a) a size forming collar/horn or diameter casing and/or (b) film material type. The controller can have predefined operational modes with film drive speed, heat seal assembly positional data for correct positioning and an operational temperature and the like. Table 1 provides an example of different parameters that may be predefined and programmed in the controller of the HMI 107 (e.g., as an electronic library or look-up chart) for automated operation for different film types and/or horn sizes (e.g., different film tubular diameters and forming collars).

TABLE 1

| Film Type/<br>thickness/<br>Manufacturer | Tubular Casing/forming<br>collar and/or Horn Size | Heat Band<br>Seal Position | Film Drive<br>Speed |
|---|---|---|---|
| F1 | T1 | H1 | D1 |
| F2 | T2 | H2 | D2 |
| F3 | T3 | H3 | D3 |

Different casing materials can have different heat and seal parameters. Examples of the different parameters include a coefficient of thermal expansion, heat seal temperature, heat band contact pressure and/or time, heat band speed, heat-band temperature and/or length and the like. Also, different target products or emulsions may impact the heat-seal operation.

Figure 10:
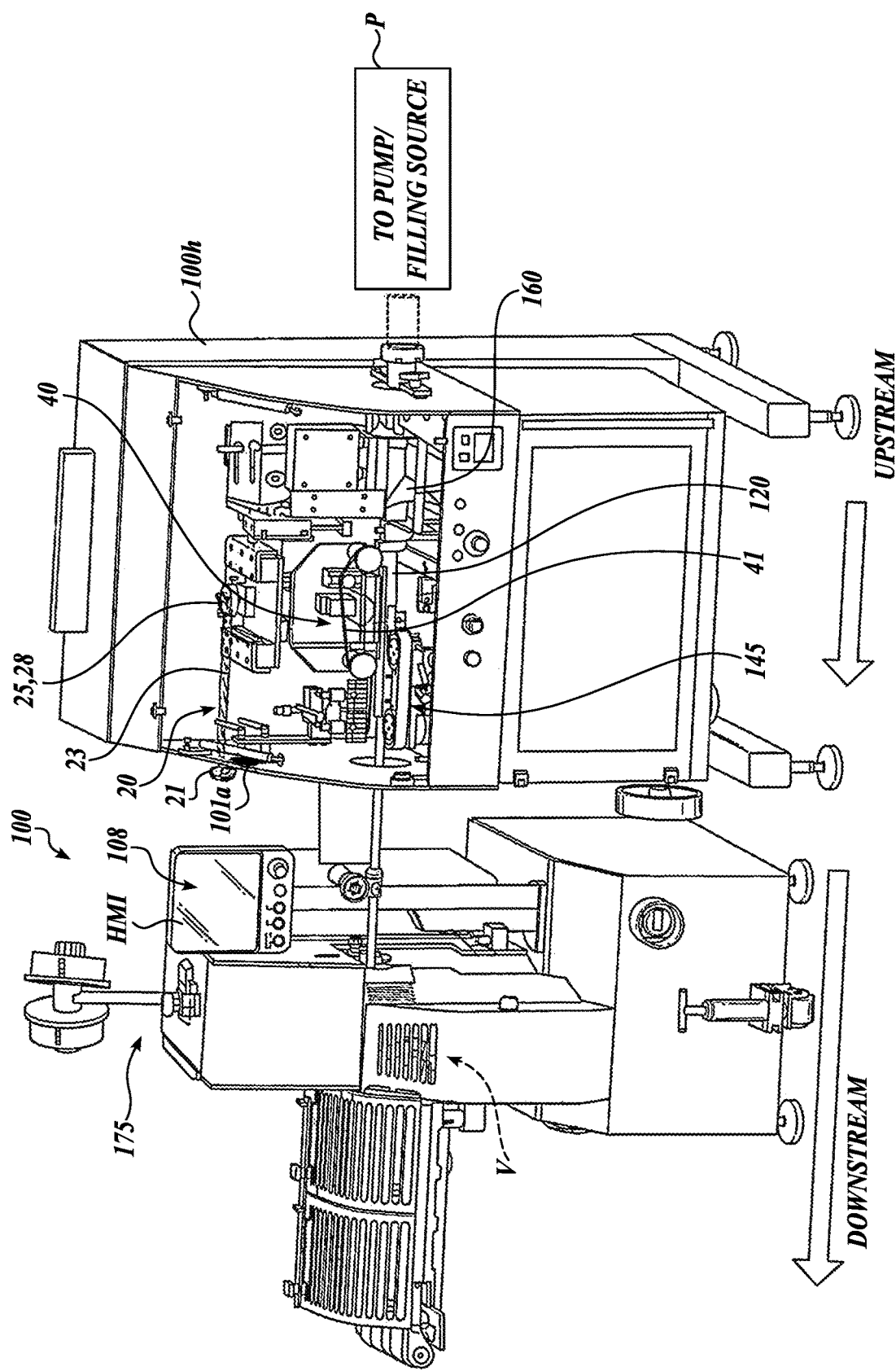
FIG. 10 is a front perspective view of a packaging machine with a clipper according to embodiments of the present invention.

As shown in FIG. 10, the packaging system 100 can include a voiding V apparatus located downstream of a respective horn 120 and heat seal assembly 40 to produce an elongated product from a filling source/pump P. The product can be produced in a linked chain of tubular or chub product with clips applied at desired intervals. The length and diameter of each link, chub or discrete product and/or the overall length of the chain can vary depending on the type of product being produced. Examples of typical strand or chain lengths are between about 1-6 feet. See, e.g., U.S. Pat. Nos. 3,543,378, 5,167,567, 5,067,313, and 5,181,302, the contents of which are hereby incorporated by reference as if recited in full herein.

The packaging system 100 can be configured to interchangeably accommodate different size horns 120 and corresponding different size forming collars 160 that form the suitable size casing. For example, the diameters of the horns 120 can range between about ¼ inch to about 8 inches, typically between ¼ inches to about 5 inches in defined size increments of ¼ inch, ½ inch or 1 inch, for example. The forming collar 160 will have a width that is larger than the corresponding horn and typically has about a 3× width as the corresponding diameter of the tubular casing.

The horn 120 can be configured as internal and external cooperating horns. For example, the internal horn can have a length that extends through an external heat seal horn 120*h* (FIGS. 8A, 8B, for example). As shown, the heat seal horn 120*h* resides at least under the heat seal assembly 40. The horn 120 may be a single horn that can have a different external shape at the forming collar and/or heat seal assembly 40, such as a flat surface aligned with the heat seal band to facilitate heat seal operation.

Figure 9A:
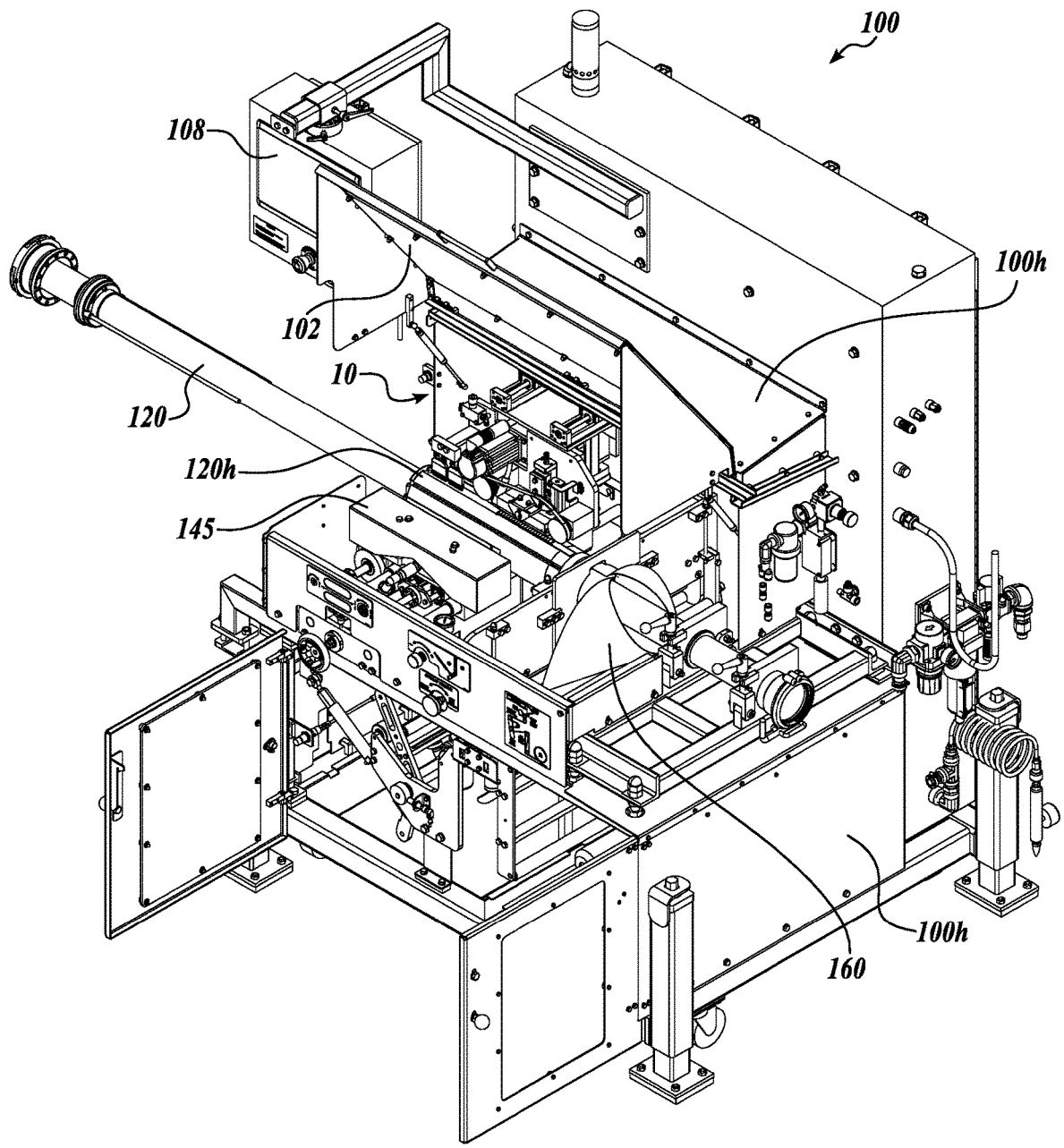
FIG. 9A is a side perspective view of the packaging machine shown in FIG. 7 with the front guard raised and front cabinet doors opened to illustrate exemplary internal components according to embodiments of the present invention.
Figure 9B:
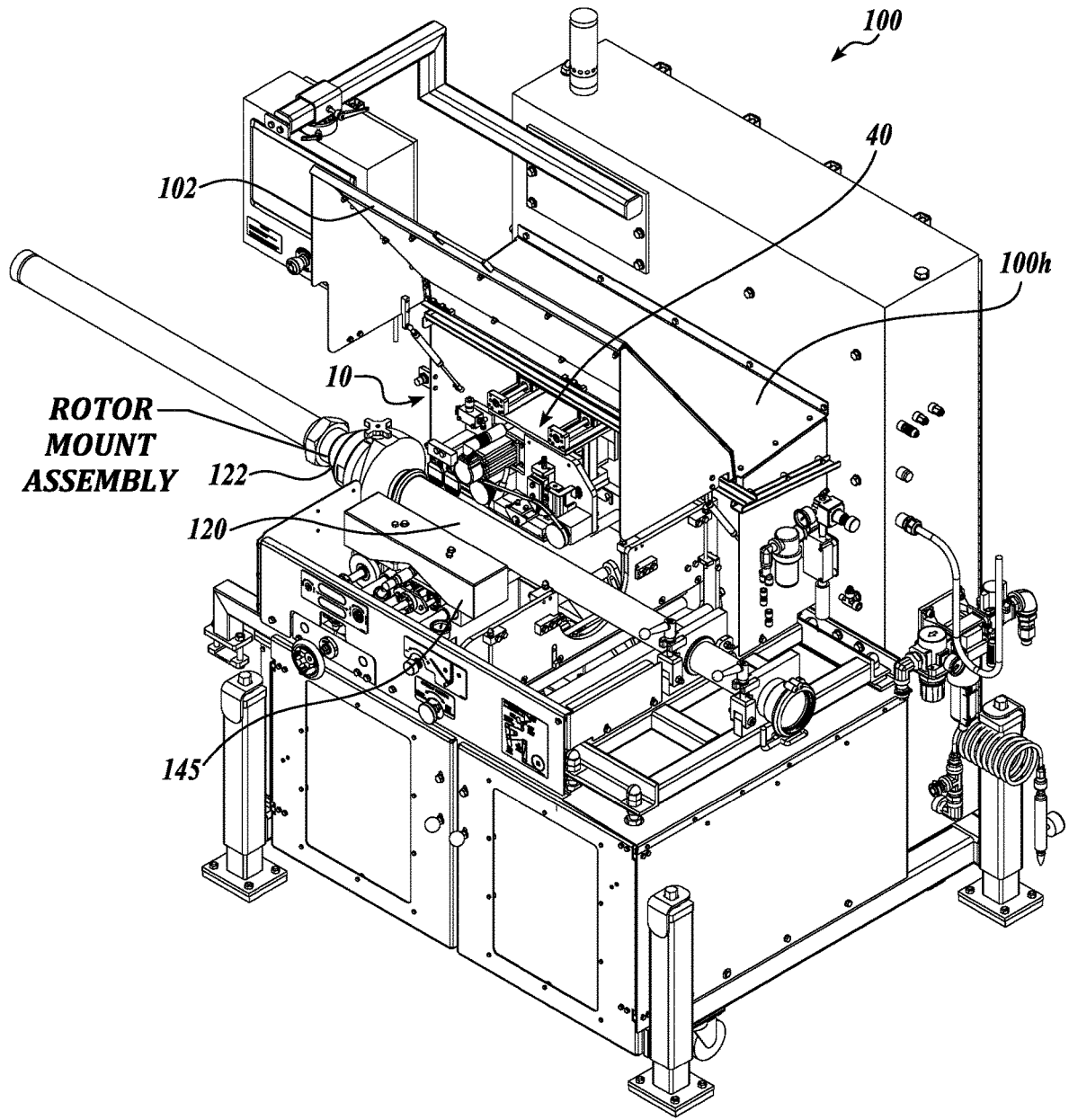
FIG. 9B is a side perspective view of the packaging machine shown in FIG. 7 with the front guard raised and front cabinet doors opened and with an optional horn rotor according to embodiments of the present invention.

FIG. 9B illustrates that the horn 120 can be configured as a horn rotor assembly 122. See. U.S. Pat. No. 7,306,511, the contents of which are hereby incorporated by reference as if recited in full herein.

FIG. 10 illustrates that the packaging machine 100 can cooperate with and/or include an automated or semi-automated clipper 175. The horn 120 can be in fluid communication with a filler/product pump P and supply located upstream thereof. As the flowable product, "pasty" or other product, exits the discharge end of the horn 120, it is stuffed into and/otherwise fills the heat-sealed tubular casing material that is held around the outer surface of the horn 120. One or more clips can be applied by the clipper 175 to seal tapered end portions of the tubular packages. Examples of exemplary devices and apparatus used to void, clip or tension casing material are described in U.S. Pat. Nos. 4,847,953; 4,675,945; 5,074,386; 5,167,567; and 6,401,885, the contents of which are hereby incorporated by reference as if recited in full herein. Generally stated, clips can be applied to the casing material to wrap around and close or seal the product therein. The seal formed by the clip against the casing may be sufficiently strong so as to be able to hold a vacuum of about 16 mm Hg for about 24-48 hours. Examples of suitable clips include metallic generally "U"-shaped clips available from Tipper Tie, Inc., in Apex, N.C. Other clips, clip materials and clip configurations may also be used.

Figure 11:
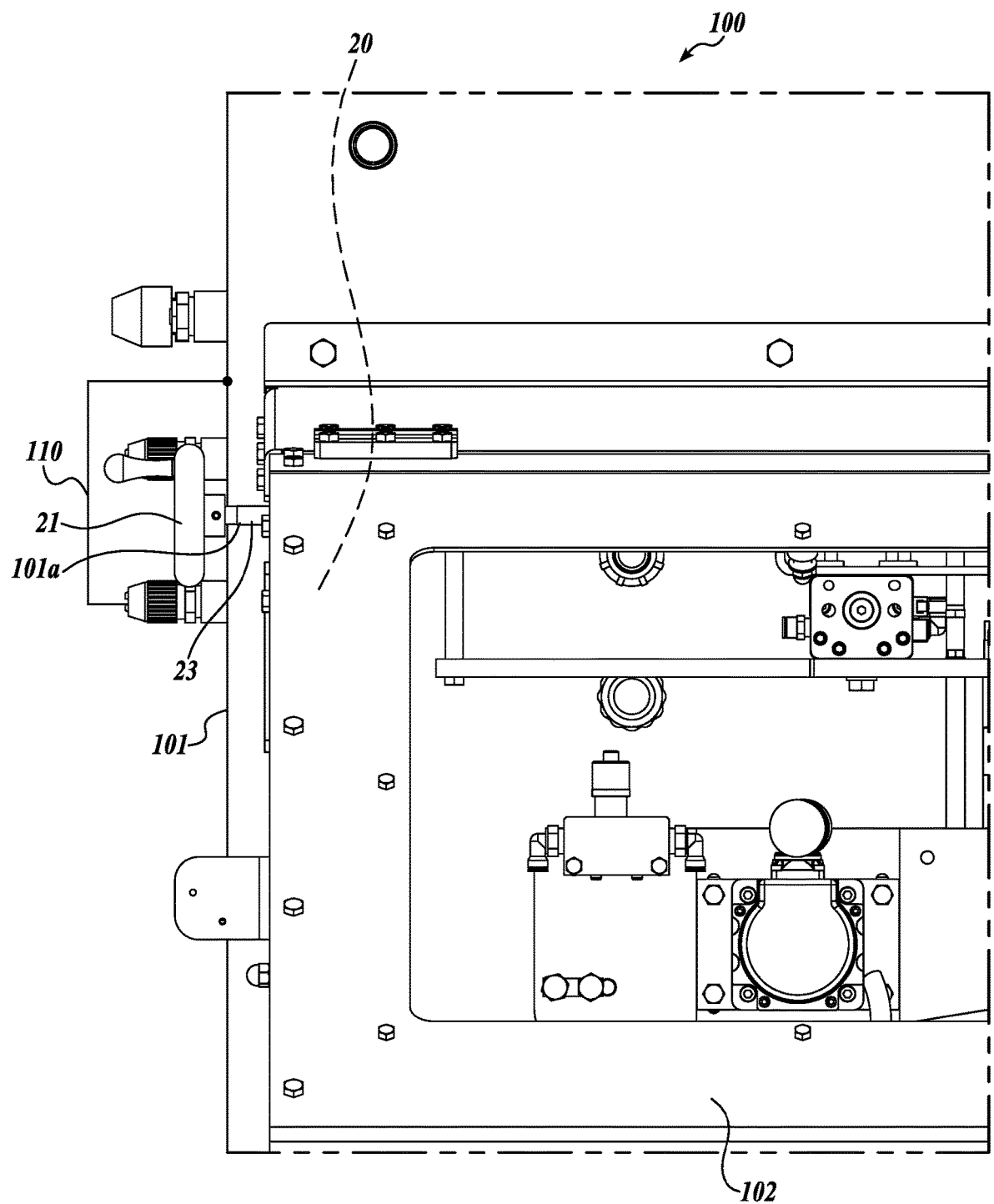
FIG. 11 is an enlarged partial front view of a packaging machine with an external user adjustment member and overlying cover according to embodiments of the present invention.

FIG. 11 illustrates that the external user adjustment member 21 can be held under a cover 110. The cover 110 can slide and/or pivot open.

Figure 12A:
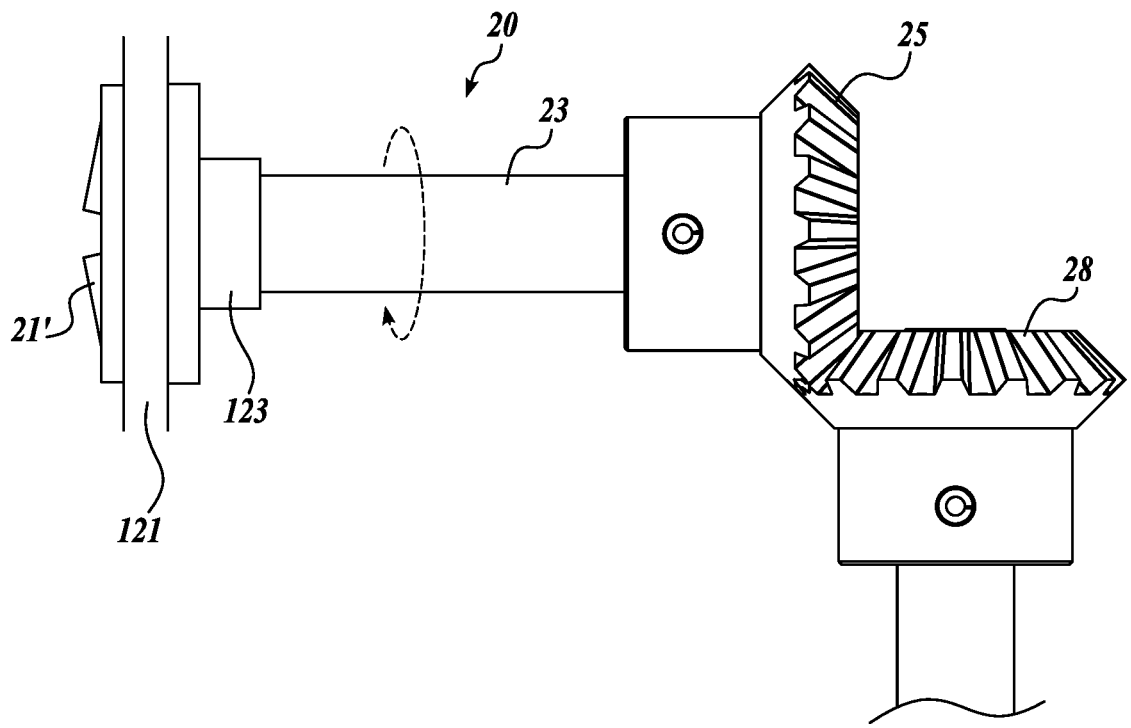
FIG. 12A is a schematic illustration of another embodiment of a user vertical height adjustment assembly for a heat-seal band according to embodiments of the present invention.

FIG. 12A illustrates an electromechanical (semi-automated) embodiment that can employ a static user adjustment member 21' such as an up/down toggle, switch or user interface or other suitable user interfaces such as a touch screen input. The user adjustment member 21' can be held on the sidewall 101 of the housing 100h and does not require lateral (front to back) travel. An electrical circuit 121 which can comprise a circuit board and/or wiring can be used to connect the user adjustment member 21' to a motor 123 which rotates the shaft 23 to move the heat seal assembly 40 up and down for the height adjustment. The motor 123 can be electrically or battery powered.

Figure 12B:
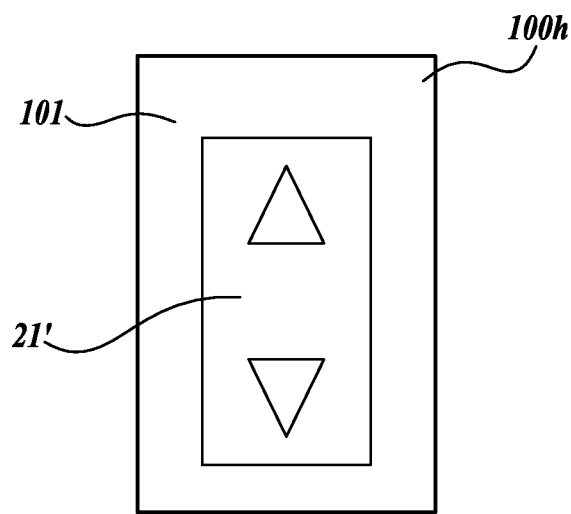
FIG. 12B is a schematic illustration of an exemplary external user adjustment input for the embodiment shown in FIG. 12A according to embodiments of the present invention.
Figure 13A:
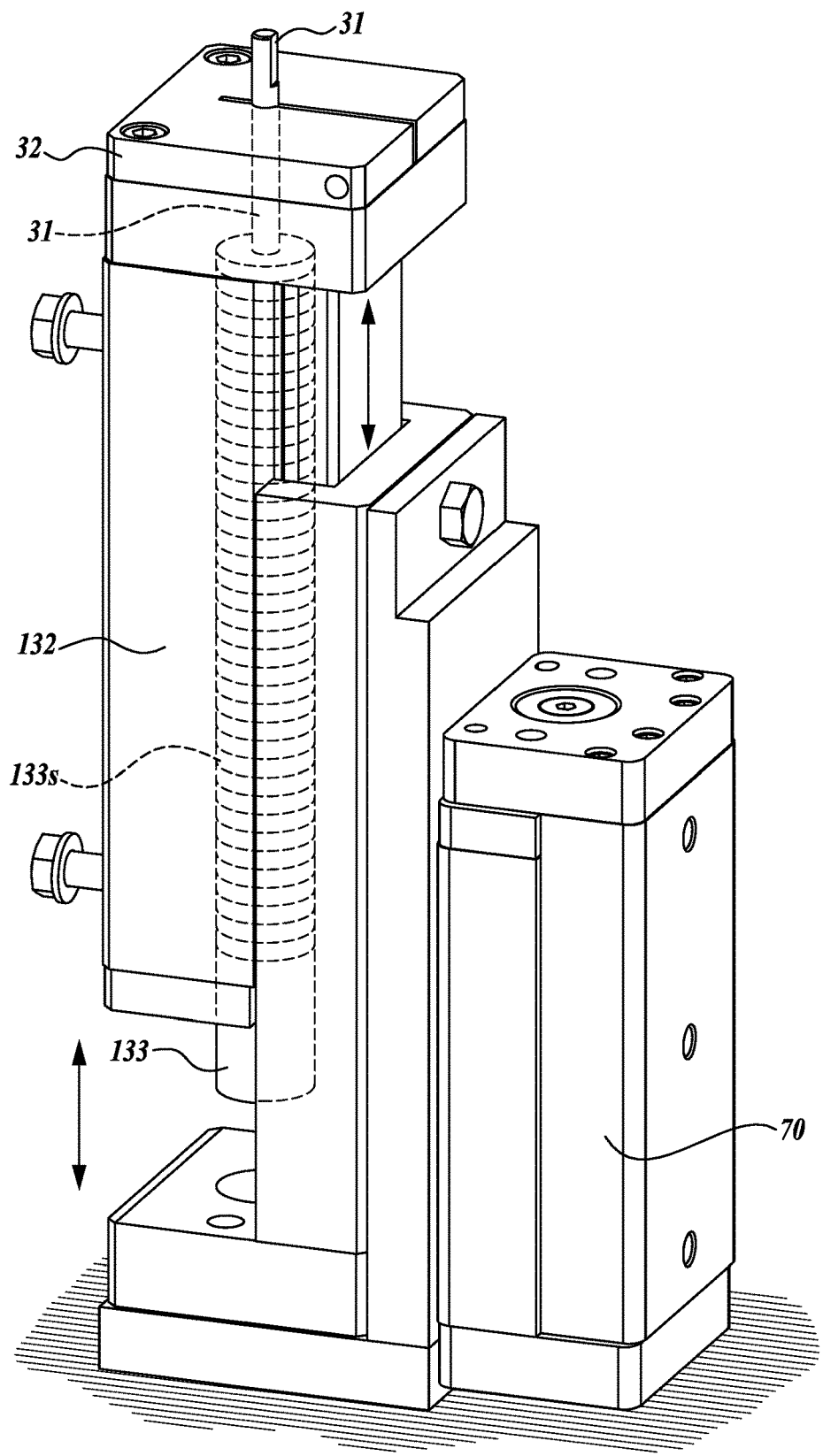
FIGS. 13A and 13B are side perspective views of an exemplary vertical height adjustment assembly in two different positions.
Figure 13B:
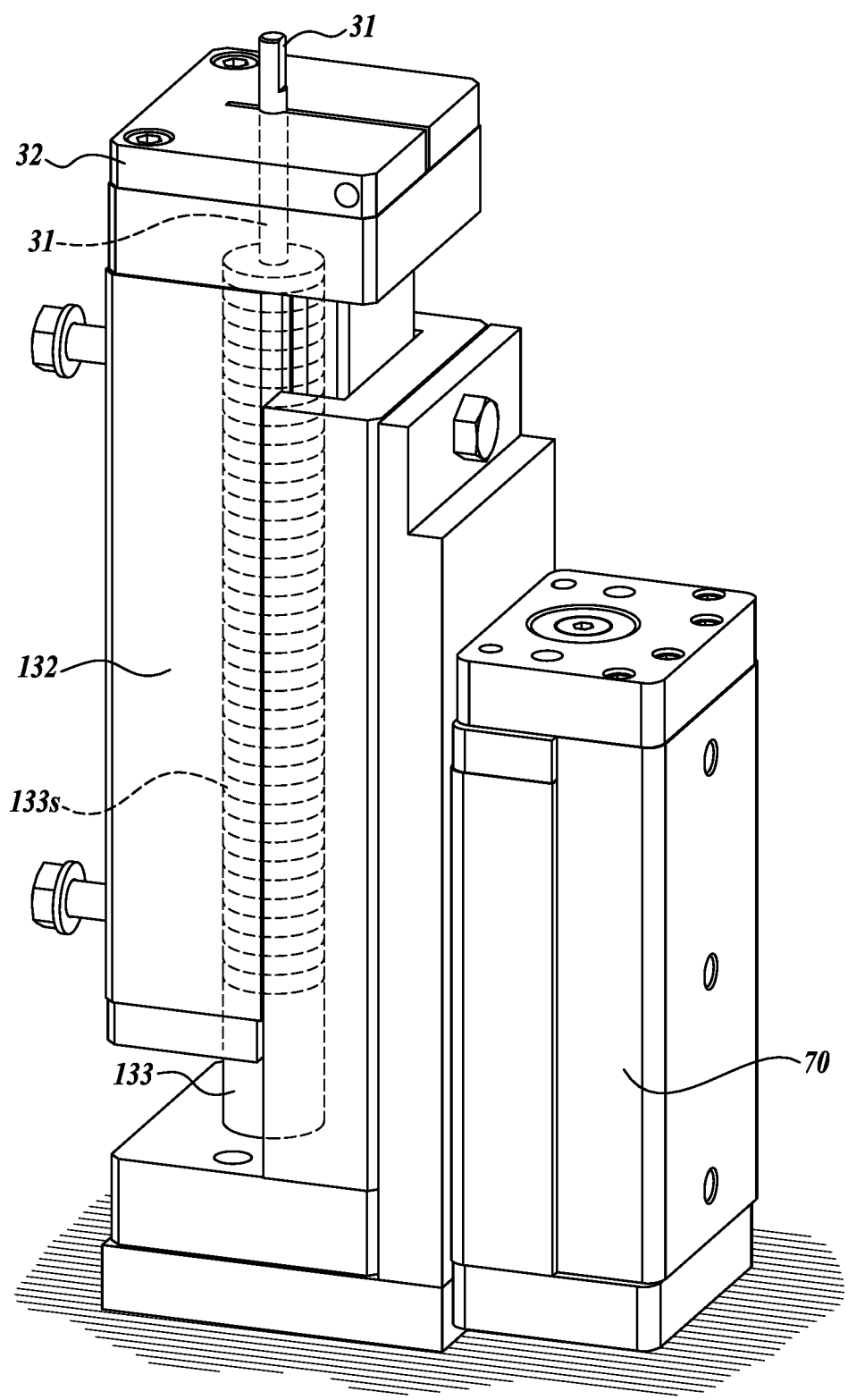
Figure 14C:
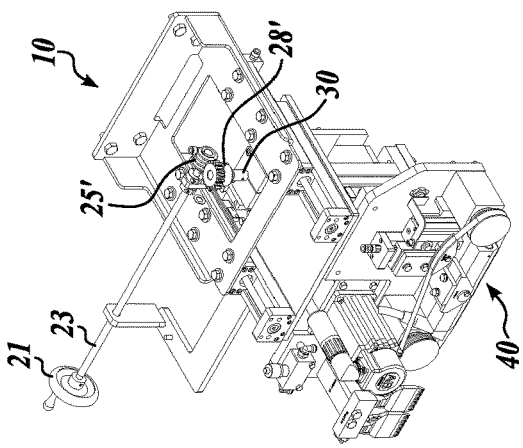
FIG. 14C is a right side perspective view of the seal unit shown in FIG. 14A.
Figure 14B:
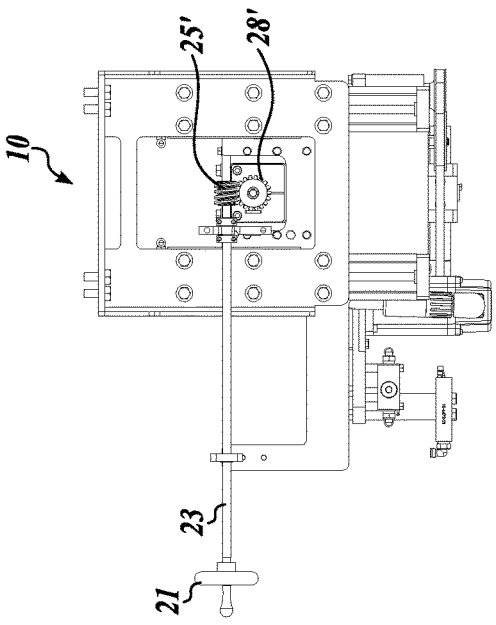
FIG. 14B is a top view of the seal unit shown in FIG. 14A.
Figure 14A:
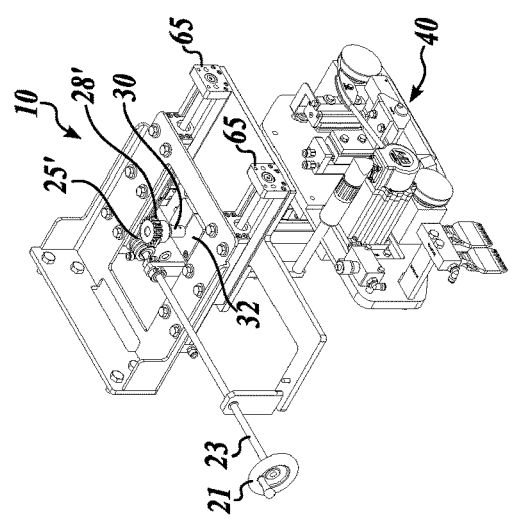
FIG. 14A is a left side perspective view of a seal unit comprising a worm gear according to some embodiments of the present invention.
Figure 14E:
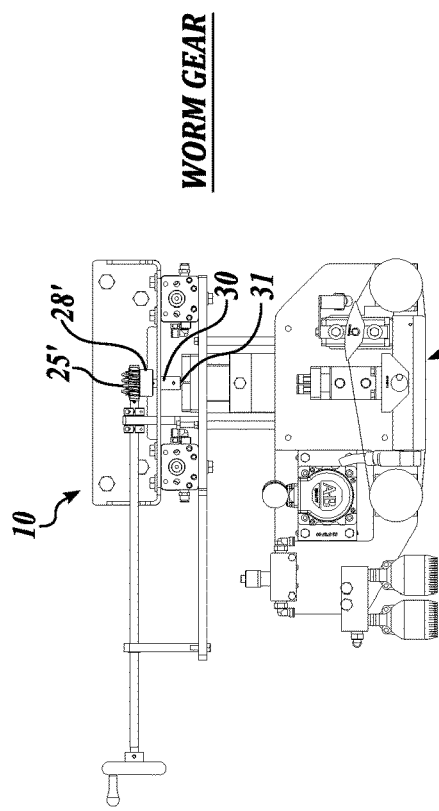
FIG. 14E is a front view of the seal unit shown in FIG. 14A.
Figure 14D:
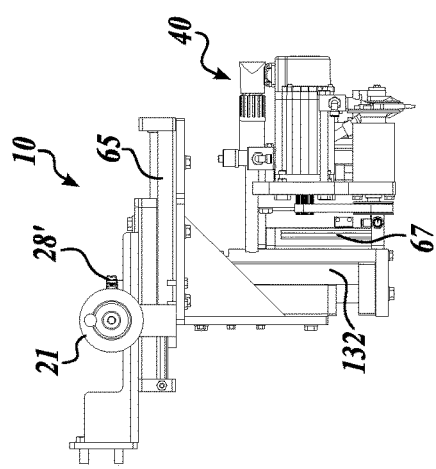
FIG. 14D is a left side view of the seal unit shown in FIG. 14A.
Figure 15C:
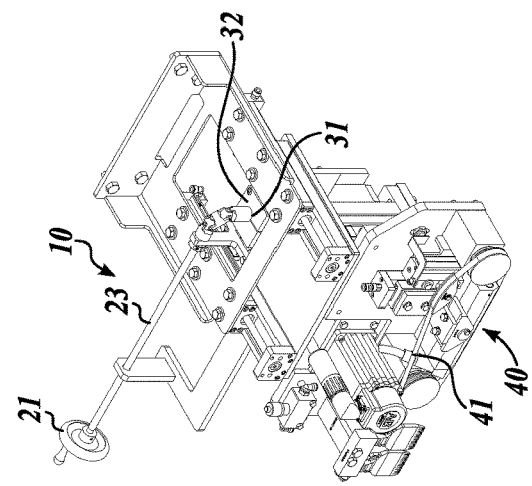
FIG. 15C is a right side perspective view of the seal unit shown in FIG. 15A.
Figure 15B:
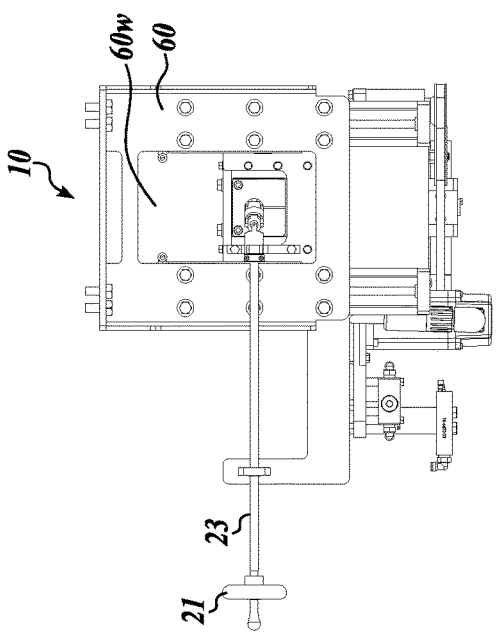
FIG. 15B is a top view of the seal unit shown in FIG. 15A.
Figure 15A:
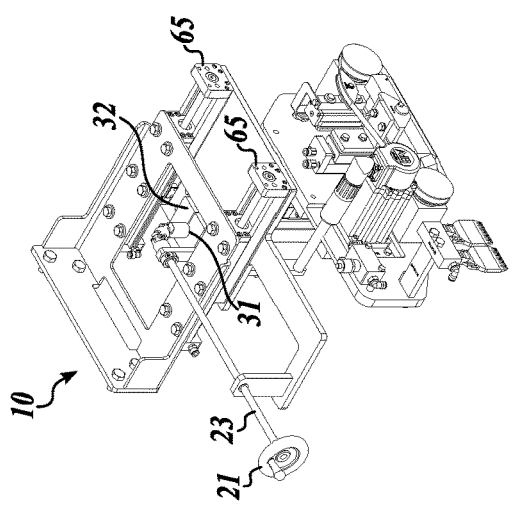
FIG. 15A is a left side perspective view of a seal unit comprising a universal joint according to some embodiments of the present invention.
Figure 15E:
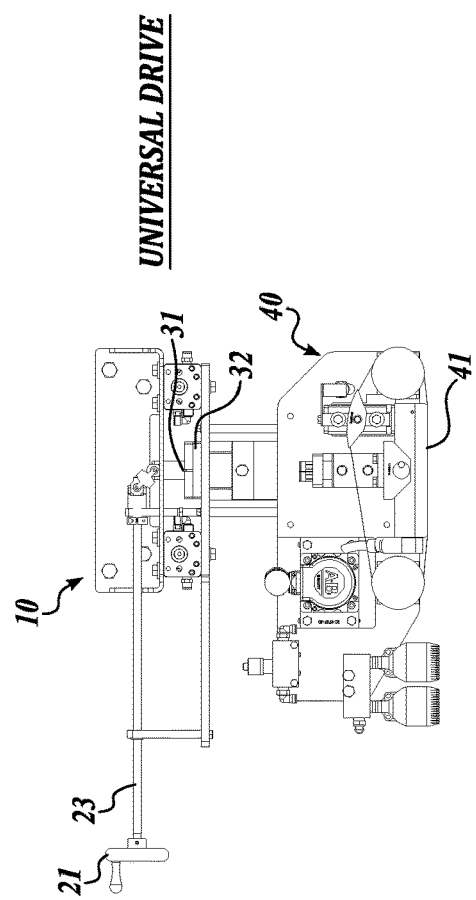
FIG. 15E is a front view of the seal unit shown in FIG. 15A.
Figure 15D:
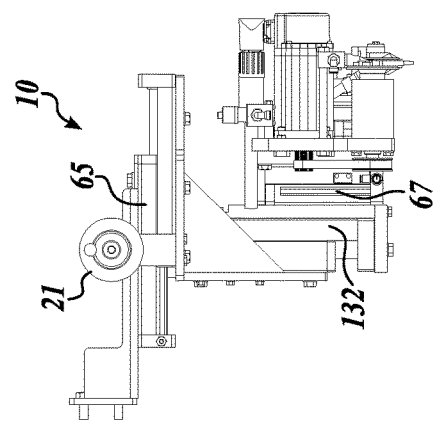
FIG. 15D is a left side view of the seal unit shown in FIG. 15A.

FIG. 12B illustrates an exemplary user adjustment member 21' for the electromechanical embodiment shown in FIG. 12A. A single depression up or down can cause a defined incremental vertical movement of the heat seal assembly 40 that is from about 0.1 mm to about 2 mm. The incremental movement can be pre-set or selectable at set-up, for example.

FIGS. 14A-14E illustrate an embodiment using a worm gear 25' as the gear on the shaft 23 and an aligned matable gear 28' to rotate the drive shaft 31 to raise/lower the heat-seal assembly 40.

FIGS. 15A-15E illustrate an embodiment using a universal drive (90 degree universal joint) attached to the drive shaft 31.

FIGS. 16A-16E illustrate a motor drive embodiment where the motor 123' output shaft/hub/rotor 124 can be aligned with and/or directly engage a screw drive 31. The motor 123' can be held on the second/lower mounting bracket 62 can translate forward and back between HOME and INTERMEDIATE/RUN positions. The motor 123' can remain at a fixed vertical height on the second/lower mounting bracket 62 and can be held on a bracket 223 that sidewalls that travel up a distance to place at least a portion of the motor body 123b above the window 60w of the first/upper mounting bracket 60. The motor 123' can be relatively compact and light weight (typically about 5 pounds or less) and with a height profile that is less than 12 inches, typically between 1-8 inches and a width that is less than its height with the output rotor 124 facing down and typically vertically in line with the drive screw shaft 31. The motor 123' can be battery powered or hardwired and powered through a power circuit. The motor 123' can be controlled via a control cable or may be controlled via wireless communication over a wide area network, a local area network, the Internet and/or via Bluetooth® wireless communications.

Figure 16C:
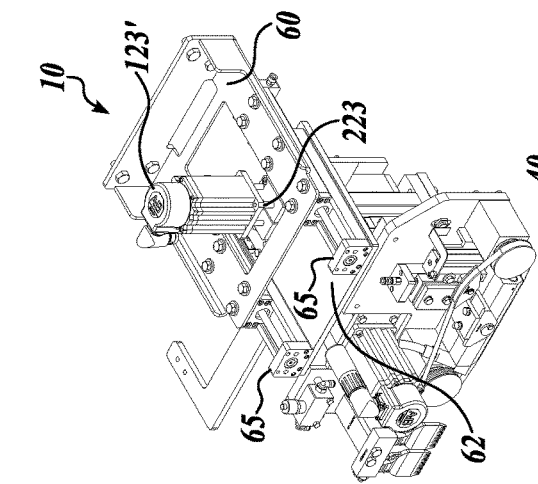
FIG. 16C is a right side perspective view of the seal unit shown in FIG. 16A.
Figure 16B:
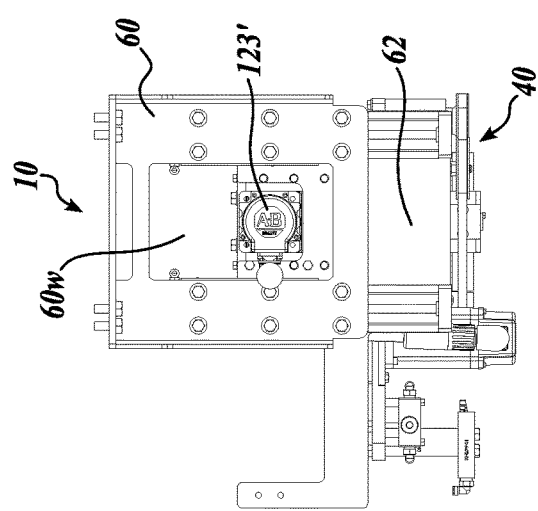
FIG. 16B is a top view of the seal unit shown in FIG. 16A.
Figure 16A:
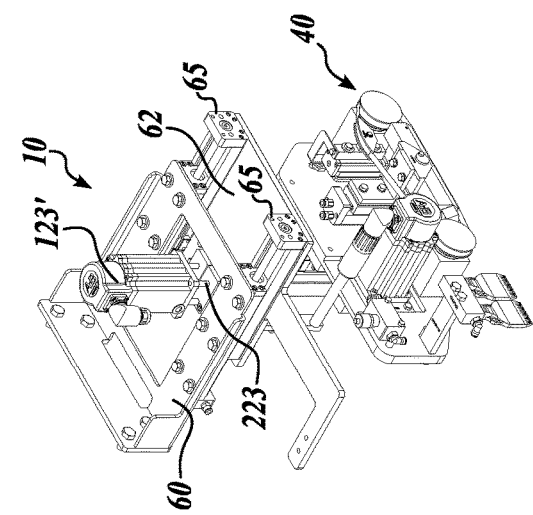
FIG. 16A is a left side perspective view of a seal unit comprising a motor drive according to some embodiments of the present invention.
Figure 16E:
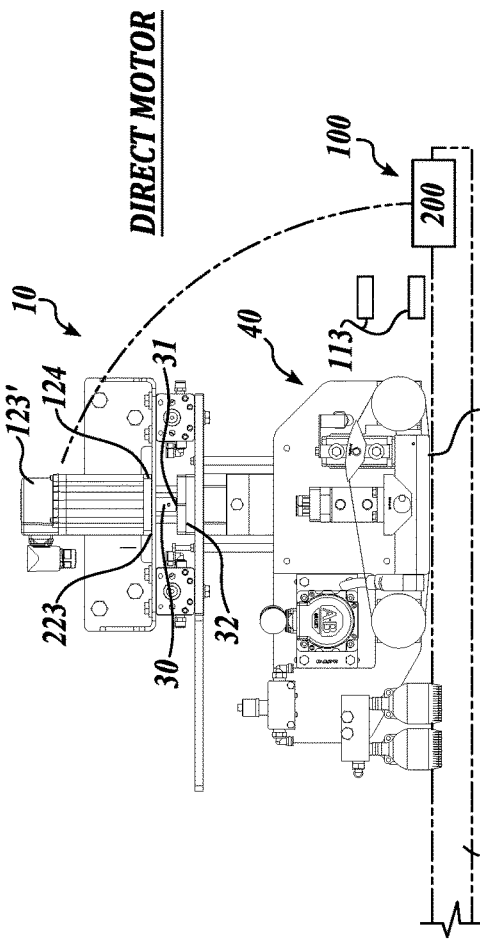
FIG. 16E is a front view of the seal unit shown in FIG. 16A.
Figure 16D:
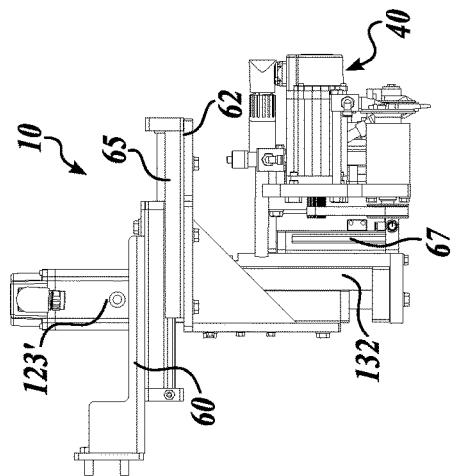
FIG. 16D is a left side view of the seal unit shown in FIG. 16A.

The motor 123' can be any suitable electric motor and may be a servo or stepper motor. As shown in FIG. 16E, the packaging system 100 can include a controller 200 and at least one encoder and/or position sensor 113 to indicate a location of the heat-seal contract member 41 (i.e., heat seal band). Thus, the motor 123' can allow a complete range of movement, not just up or down but where the heat-seal assembly is in a complete range of vertical movement.

In some embodiments, the up/down actuator 70 is a two position pneumatic cylinder for raising and lowering the heat-seal assembly 40 between a RUN mode and a HOME or INTERMEDIATE (not running mode(s)) while the screw adjustment assembly 132 can set the height of the heat-seal assembly 40 as a whole.

It is contemplated that in some embodiments, such as where a motor 123 and screw drive 132 (or any linear electric actuator drive) is used, the up/down cylinder 70 or actuator could be optional.

In some embodiments, with reference to FIG. 16E, for example, a stepper or servo motor 123' and vertical/linear electric actuator drive system (i.e., linear actuator or screw drive) using a setup with position sensing via an encoder and/or position sensor 113, the up/down actuator 70 may be eliminated and the motor/linear actuator may be used to perform both up/down and fine adjustment, potentially using an open or closed control feedback system. The motor 123' with position sensing may be configured to provide complete control of a height position of the band 41 so the height may be trimmed/adjusted while running or raised completely to stop running.

Figure 17:
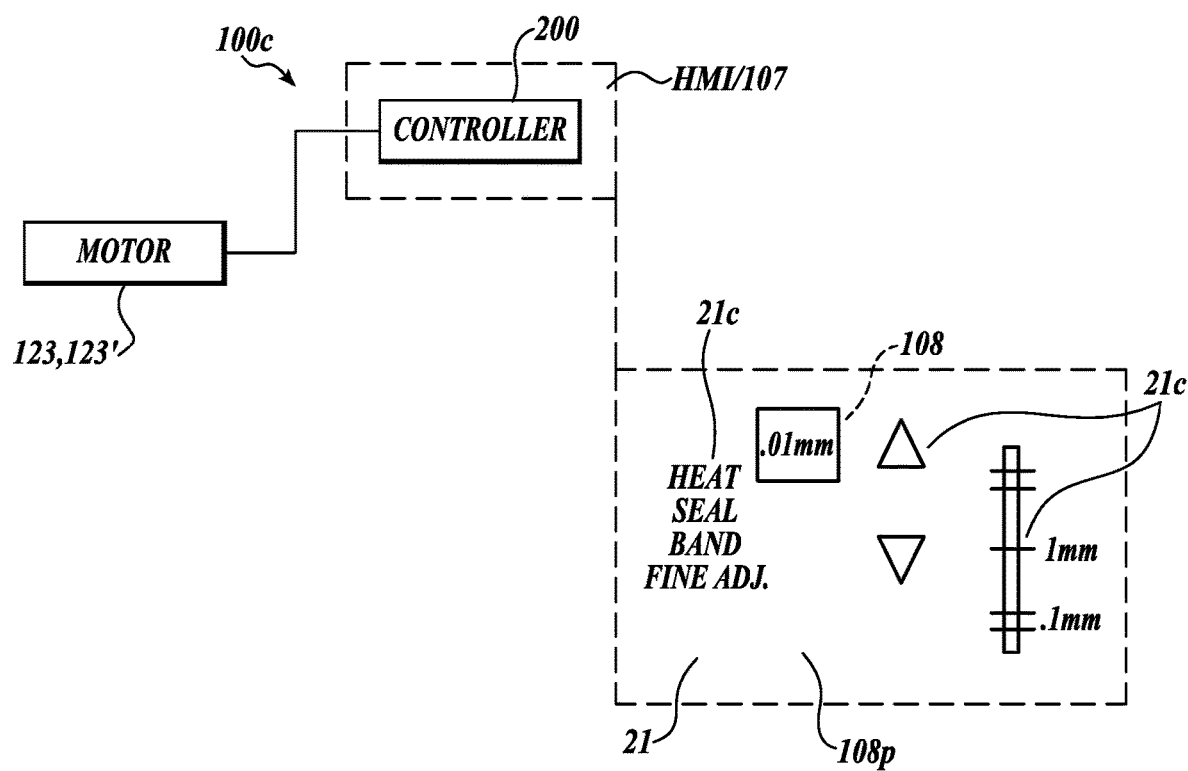
FIG. 17 is a schematic illustration of a control circuit with a user adjustment interface for a height adjustment module according to embodiments of the present invention.

FIG. 17 illustrates a control circuit 100c for the packaging machine 100 with the user adjustment interface or member 21 can be provided as a user interface 21i via the HMI 107, typically accessible via the display 108 and provide in the PLC or other controller 200. Touch screen, cursor or other user interface inputs can direct the operation of the height adjustment/motor 123, 123'. An electronic menu, page or window 108p accessible via the display 108 can provide a heat seal band height adjustment module with user controls 21e to operate the motor 123, 123' in fixed or selectable increments, such as from 0.1 mm to 25 mm, for example.

Figure 18:
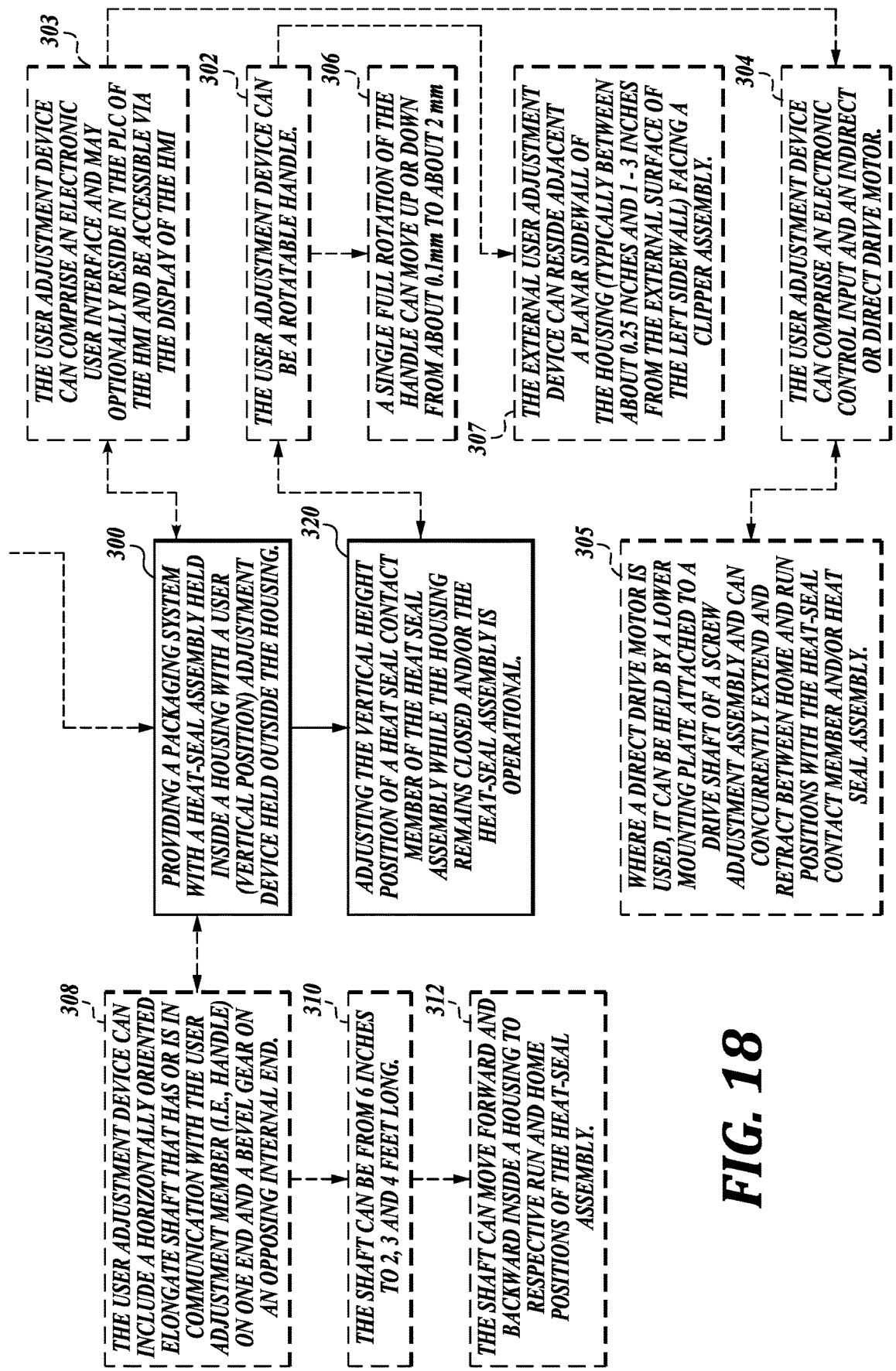
FIG. 18 is a flow chart of exemplary operations that can be used for operating a packaging machine according to embodiments of the present invention.

FIG. 18 illustrates a method of steps or actions that can be used to carry out embodiments of the present invention. A packaging system with a heat-seal assembly held inside a housing with a user vertical position adjustment device held outside the housing is provided (block 300). A vertical height position of a heat seal contact member of the heat seal assembly is adjusted by a user while the housing remains closed and/or while film is pulled through the housing and/or the heat-seal assembly is operational (block 320).

The user adjustment device can be a rotatable handle (block 302).

The user adjustment device can comprise an electronic user interface (block and may optionally reside in the PLC of the HMI and be accessible via the display.

The user adjustment device can comprise an electronic control input and an indirect or direct drive motor (block 304).

Where a direct drive motor is used, it can be held by a lower mounting plate attached to a drive shaft of a screw adjustment assembly and can concurrently extend and retract between HOME and RUN positions with the heat-seal contact member and/or heat seal assembly (block 305).

Where an external handle is used, a single full rotation of the handle can move the height up or down from 01 mm to 2 mm (block 306).

The external user adjustment device can reside adjacent a planar sidewall of the housing, typically between about 0.25 inches and about 1-3 inches from the external surface of the left sidewall, facing a clipper assembly (block 307).

The user adjustment device can include a horizontally oriented elongate shaft that has or is in communication with the user adjustment member on one end and a bevel gear on an opposing internal end (block 308).

The shaft can be from 6 inches to 4 feet long, more typically between 1-2 feet long (block 310).

The shaft can move forward and backward inside a housing to respective RUN and HOME positions of the heat-seal assembly (block 312).

Flat roll stock casing material can be pulled through a forming collar upstream of the heat seal assembly to form a shaped (typically tubular) casing that can be contacted by the heat-seal contact member of the heat seal assembly in the RUN position. Long edges of the casing material are thereby sealed together.

The casing can be formed into a tubular shaped casing and at least one clip can be applied to at least one gathered end portion(s) of a sealed casing.

The sealing can be carried out using a rotating heat-band seal band of the heat seal assembly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The embodiments of the invention in which an exclusive property or privilege is claimed are defined as follows:

1. A packaging system, comprising:
   a heat seal assembly with a heat seal contact member located in a housing; and
   a user adjustment interface or member disposed external to the housing in communication with the heat seal assembly, wherein the external user adjustment interface or member directs the heat seal assembly in the housing to move vertically in response to user input; and
   a horizontal adjustment system operable independently of the user adjustment interface to direct the heat seat assembly to move horizontally between a retracted HOME position and an extended RUN position.

2. The system of claim 1, further comprising:
   a rotatable shaft held in the housing either (a) attached to the external user adjustment interface or (b) in electro-mechanical communication with the external user adjustment interface; and
   a first torque transfer member held on an internal end portion of the shaft.

3. The system of claim 2, wherein the shaft holds the first torque transfer member on the internal end of the shaft, the system further comprising a second torque transfer member in operable engagement with the first torque transfer member and being rotatable about an axis of rotation, wherein the second torque transfer member rotates an underlying rotational drive assembly attached to the heat seal assembly to vertically move the heat seal assembly in response to rotation of the rotatable shaft.

4. The system of claim 2, wherein the housing comprises an aperture, wherein the shaft extends out of the housing through the aperture to the user adjustment interface, wherein the aperture has a length sufficient to allow the shaft to move back to front in the housing a distance between HOME and RUN positions.

5. The system of claim 1, further comprising a product horn in the housing under the heat seal assembly, wherein the user adjustment interface is configured to move forward from a HOME position to a RUN position concurrently with the heat seal assembly, and wherein in the RUN position, the heat seal contact member of the heat seal assembly is located over the product horn.

6. The system of claim 1, further comprising an actuator residing over the heat seal assembly in communication with the external user adjustment interface, wherein the actuator engages a torque drive assembly operably connected to the heat seal assembly to vertically move the heat seal assembly.

7. The system of claim 6, further comprising:
   a first mounting bracket with an interior open window space; a second mounting bracket under the first mounting bracket;
   first and second linear actuators residing on the second mounting bracket under and outside of the first mounting bracket open window space; and
   an actuator mounting bracket held by the second mounting bracket and extending above the first mounting bracket through the open window space, wherein the actuator and the actuator mounting bracket translate back to front with the actuator mount in the open window space of the first mounting bracket in the housing from a HOME to a RUN position.

8. The system of claim 7, further comprising a third mounting bracket holding the heat seal assembly, the third mounting bracket attached to a front portion of the second mounting bracket and in communication with the first and second linear actuators so that the first and second linear actuators extend and retract the third mounting bracket to move the heat seal assembly between HOME and RUN positions.

9. The system of claim 8, further comprising an up/down linear actuator with a reciprocating rod that extends up and down above a body of the up/down linear actuator, the rod attached to a mounting member residing behind the third mounting bracket to retract to lower the heat seal assembly to the RUN position.

10. The system of claim 9, further comprising an adjustment assembly attached to the up/down linear actuator with a clamp plate residing in the window of the first mounting bracket and holding a vertically oriented shaft, pin and/or drive screw that engages either the actuator or a second torque transfer member over the shaft.

11. The system of claim 7, wherein the user adjustment interface comprises electronically selectable vertical height controls that resides in a controller accessible by a display providing a Human/Machine Interface of the packaging system.

12. The system of claim 1, wherein the heat seal contact member comprises a rotating band.

13. A packaging system, comprising:
   (a) a heat seal assembly with a heat seal contact member located in a housing;
   (b) a first mounting bracket mounted in stationary position within the housing;
   (c) a second mounting bracket located under the first mounting bracket;
   (d) an actuation system disposed between the first and second mounting brackets to horizontally shift the second mounting bracket between an extended RUN position and a retracted HOME position;

(e) a third mounting bracket on which the heat seal assembly is mounted;

(f) a vertical actuator interconnecting the second and third mounting brackets;

(g) a user interface disposed external to the housing to operate the vertical actuator to move the seal assembly between an upper retracted HOME position and a lowered RUN position.

14. The packaging system according to claim 13, further comprising a tour transfer assembly disposed between the user interface and the vertical actuator to operate the vertical actuator by manipulation of the user interface.

15. The packaging system according to claim 14, wherein the torque transfer assembly is mounted on the second mounting bracket.

16. A packaging system, comprising:
a heat seal assembly with a heat seal contact member located in a housing;
a user adjustment interface or member disposed external to the housing in communication with the heat seal assembly, wherein the external user adjustment interface or member directs the heat seal assembly in the housing to move vertically in response to user input;
a rotatable shaft held in the housing either (a) attached to the external user adjustment interface or (b) in electro-mechanical communication with the external user adjustment interface;
a first torque transfer member held on an internal end portion of the shaft;
a first mounting bracket;
a second mounting bracket under the first mounting bracket;
first and second spaced apart bearing blocks holding the shaft, wherein the second bearing block resides in a window in the first mounting bracket and the first bearing block resides on a leg of the second mounting bracket spaced apart from the first mounting bracket to reside closer to a left sidewall of the housing; and
first and second actuation cylinders residing on the second mounting bracket and under of the first mounting bracket window.

17. A packaging system, comprising:
a heat seal assembly with a heat seal contact member located in a housing;
a user adjustment interface or member disposed external to the housing in communication with the heat seal assembly, wherein the external user adjustment interface or member directs the heat seal assembly in the housing to move vertically in response to user input;
a rotatable shaft held in the housing either (a) attached to the external user adjustment interface or (b) in electro-mechanical communication with the external user adjustment interface;
a first torque transfer member held on an internal end portion of the shaft;
wherein the shaft resides above a first mounting bracket and is attached to a second mounting bracket that is under the first mounting bracket, and wherein the shaft translates over the first mounting bracket from a HOME to a RUN position in the housing.

18. A packaging system, comprising:
a heat seal assembly with a heat seal contact member located in a housing;
a user adjustment interface or member disposed external to the housing in communication with the heat seal assembly, wherein the external user adjustment interface or member directs the heat seal assembly in the housing to move vertically in response to user input;
a rotatable shaft held in the housing either (a) attached to the external user adjustment interface or (b) in electro-mechanical communication with the external user adjustment interface;
a first torque transfer member held on an internal end portion of the shaft; and
further comprising a clipper residing downstream of the housing with the heat seal assembly, wherein the housing of the heat seal assembly comprises a left sidewall facing the clipper, wherein the left sidewall comprises a horizontal wherein the shaft extends out of the left sidewall through the slot with the user adjustment interface located outside the slot external to the left sidewall, and wherein the slot has a length sufficient to allow the shaft to move back to front in the housing a distance between HOME and RUN positions.

* * * * *

UNITED STATES PATENT AND TRADEMARK OFFICE
CERTIFICATE OF CORRECTION

PATENT NO. : 11,110,666 B2
APPLICATION NO. : 16/272891
DATED : September 7, 2021
INVENTOR(S) : S. Griggs et al.

Page 1 of 1

It is certified that error appears in the above-identified patent and that said Letters Patent is hereby corrected as shown below:

In the Claims

| Column | Line | |
|---|---|---|
| 17 | 46 | in Claim 1 change "seat" to -- seal --. |
| 20 | 15 & 16 | in Claim 17 change "horizontal" to -- horizontal slot, --. |

Signed and Sealed this
Sixteenth Day of April, 2024

Katherine Kelly Vidal
*Director of the United States Patent and Trademark Office*